United States Patent
Jang

(10) Patent No.: US 12,510,734 B2
(45) Date of Patent: Dec. 30, 2025

(54) OPTICAL IMAGING SYSTEM

(71) Applicant: Samsung Electro-Mechanics Co., Ltd., Suwon-si (KR)

(72) Inventor: Sang Hyun Jang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 312 days.

(21) Appl. No.: 18/235,452

(22) Filed: Aug. 18, 2023

(65) Prior Publication Data

US 2024/0184083 A1 Jun. 6, 2024

(30) Foreign Application Priority Data

Dec. 5, 2022 (KR) ........................ 10-2022-0168108

(51) Int. Cl.
*G02B 9/64* (2006.01)
*G02B 13/00* (2006.01)

(52) U.S. Cl.
CPC .......... *G02B 9/64* (2013.01); *G02B 13/0045* (2013.01)

(58) Field of Classification Search
None
See application file for complete search history.

(56) References Cited

U.S. PATENT DOCUMENTS

| 2014/0184887 A1* | 7/2014 | Yonetani | G02B 13/0015 359/557 |
| 2020/0249430 A1* | 8/2020 | Kawamura | G02B 13/02 |
| 2020/0393653 A1 | 12/2020 | Chen | |
| 2022/0196971 A1 | 6/2022 | Chen et al. | |
| 2022/0283408 A1 | 9/2022 | Tseng et al. | |
| 2022/0382010 A1* | 12/2022 | Suzuki | G02B 7/04 |

(Continued)

FOREIGN PATENT DOCUMENTS

| CN | 213750482 U | 7/2021 |
| CN | 114624859 A | 6/2022 |
| EP | 4 375 722 A2 | 5/2024 |

(Continued)

OTHER PUBLICATIONS

Taiwanese Office Action issued on Aug. 7, 2024, in counterpart Taiwanese Patent Application No. 112131755 (5 pages in English, 6 pages in Chinese).

(Continued)

*Primary Examiner* — Darryl J Collins
(74) *Attorney, Agent, or Firm* — NSIP Law

(57) ABSTRACT

An optical imaging system includes a first lens, a second lens, a third lens, a fourth lens, a fifth lens, a sixth lens, a seventh lens, an eighth lens, a ninth lens, a tenth lens, and an eleventh lens sequentially arranged in order along an optical axis from an object side of the optical imaging system toward an imaging surface of the optical imaging system, wherein the first lens has a positive refractive power, the second lens has a negative refractive power, at least two lenses sequentially arranged along the optical axis among the first lens to the fourth lens have an Abbe number of less than 38, and TTL/(2×IMG HT)<0.660 is satisfied, where TTL is a distance along the optical axis from an object-side surface of the first lens to the imaging surface, and IMG HT is one half of a diagonal length of the imaging surface.

31 Claims, 12 Drawing Sheets

(56) References Cited

U.S. PATENT DOCUMENTS

2022/0390711 A1* 12/2022 Kim .................. G02B 13/0045

FOREIGN PATENT DOCUMENTS

| IN | 202134049133 A | 6/2022 |
|----|----------------|--------|
| IN | 202134057125 A | 9/2022 |
| TW | 202223480 A | 6/2022 |

OTHER PUBLICATIONS

Korean Office Action issued on Nov. 27, 2024, in counterpart Korean Patent Application No. 10-2022-0168108 (4 pages in English, 4 pages in Korean).

Indian Office Action issued on Nov. 12, 2025, in counterpart Indian Patent Application No. 202314056703 (8 pages in Hindi and English dual text).

* cited by examiner

OPTICAL IMAGING SYSTEM

CROSS-REFERENCE TO RELATED APPLICATIONS

This application claims the benefit under 35 USC 119(a) of Korean Patent Application No. 10-2022-0168108 filed on Dec. 5, 2022, in the Korean Intellectual Property Office, the entire disclosure of which is incorporated herein by reference for all purposes.

BACKGROUND

1. Field

The present disclosure relates to an optical imaging system.

2. Description of Related Art

Portable terminals have recently included a camera including an optical imaging system including a plurality of lenses to enable video calls and image capturing operations.

Additionally, with a gradual increase in the use of cameras in portable terminals, the demand for cameras for portable terminals having a high resolution has increased.

Additionally, as the form factor of portable terminals has decreased, miniaturized cameras for portable terminals are desired. Accordingly, the development of an optical imaging system that achieves a high resolution while being slim is desired.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, a sixth lens, a seventh lens, an eighth lens, a ninth lens, a tenth lens, and an eleventh lens sequentially arranged in ascending numerical order along an optical axis of the optical imaging system from an object side of the optical imaging system toward an imaging surface of the optical imaging system, wherein the first lens has a positive refractive power, and the second lens has a negative refractive power, at least two lenses sequentially arranged along the optical axis among the first lens to the fourth lens have an Abbe number of less than 38, and TTL/(2×IMG HT)<0.660 is satisfied, where TTL is a distance along the optical axis from an object-side surface of the first lens to the imaging surface, and IMG HT is one half of a diagonal length of the imaging surface.

Either one or both of 30<v1-v2<45 and 30<v1-v3<45 may be satisfied, where v1 is an Abbe number of the first lens, v2 is an Abbe number of the second lens, and v3 is an Abbe number of the third lens.

At least two lenses sequentially arranged along the optical axis among the fifth to ninth lenses may have an Abbe number of less than 38.

Any one or any combination of any two or more of 30<v1-v6<45, 30<v1-v7<45, and 15<v1-v9<25 may be satisfied, where v1 is an Abbe number of the first lens, v6 is an Abbe number of the sixth lens, v7 is an Abbe number of the seventh lens, and v9 is an Abbe number of the ninth lens.

At least two lenses sequentially arranged along the optical axis among the second lens to the seventh lens may have an Abbe number of less than 24.

Any one or any combination of any two or more of the third lens to the fifth lens may have a refractive index of greater than 1.56 and an Abbe number of less than 38.

Any one or any combination of any two or more of the sixth lens to the eighth lens may have a refractive index of greater than 1.67 and an Abbe number of less than 20.

Fno<1.70 may be satisfied, where Fno is an f-number of the optical imaging system.

D15/L1S1E<1.200 may be satisfied, where D15 is a distance along the optical axis from the object-side surface of the first lens to an image-side surface of the fifth lens, and L1S1E is an effective radius of the object-side surface of the first lens.

Nv50≥5 may be satisfied, where Nv50 is a number of lenses among the first to eleventh lenses having an Abbe number of less than 50.

Nv24≥3 may be satisfied, where Nv24 is a number of lenses among the first to eleventh lenses having an Abbe number of less than 24.

A composite focal length of the third lens, the fourth lens, and the fifth lens may have a positive value, and the composite focal length of the third lens, the fourth lens, and the fifth lens may be greater than an absolute value of a focal length of the second lens.

f345/f1>6 may be satisfied, where f345 is the composite focal length of the third lens, the fourth lens, and the fifth lens, and f1 is a focal length of the first lens.

A composite focal length of the sixth lens, the seventh lens, and the eighth lens may have a negative value, and an absolute value of the composite focal length of the sixth lens, the seventh lens, and the eighth lens may be less than a focal length of each of the third lens, the fourth lens, and the fifth lens.

4<|f678|/f1<7 may be satisfied, where f678 is the composite focal length of the sixth lens, the seventh lens, and the eighth lens, and f1 is a focal length of the first lens.

Each of the first lens to the fifth lens may have a convex object-side surface in a paraxial region thereof, and a concave image-side surface in a paraxial region thereof.

The sixth lens may have a concave object-side surface in a paraxial region thereof, and a convex image-side surface in a paraxial region thereof.

The seventh lens may have a concave object-side surface in a paraxial region thereof.

The eighth lens may have a convex image-side surface in a paraxial region thereof.

The ninth lens may have a convex object-side surface in a paraxial region thereof, and a concave image-side surface in a paraxial region thereof.

The tenth lens may have a positive refractive power, a convex object-side surface in a paraxial region thereof, and a concave image-side surface in a paraxial region thereof.

The eleventh lens may have a negative refractive power, and a concave image-side surface in a paraxial region thereof.

The tenth lens may have a positive refractive power, and the eleventh lens may have a negative refractive power.

In another general aspect, an optical imaging system includes a first lens, a second lens, a third lens, a fourth lens, a fifth lens, a sixth lens, a seventh lens, an eighth lens, a ninth lens, a tenth lens, and an eleventh lens sequentially arranged in ascending numerical order along an optical axis of the optical imaging system from an object side of the optical imaging system toward an imaging surface of the optical imaging system, wherein the first lens has a positive refractive power, and the second lens has a negative refractive power, Nv24≥3 is satisfied, where Nv24 is a number of lenses among the first to eleventh lenses having an Abbe number of less than 24, and TTL/(2×IMG HT)<0.660 is satisfied, where TTL is a distance along the optical axis from an object-side surface of the first lens to the imaging surface, and IMG HT is one half of a diagonal length of the imaging surface.

The tenth lens may have a positive refractive power, and the eleventh lens may have a negative refractive power.

Each of the first to fifth, ninth, and tenth lenses may have a convex object-side surface in a paraxial region thereof, and a concave image-side surface in a paraxial region thereof.

The sixth lens may have a concave object-side surface in a paraxial region thereof, and a convex image-side surface in a paraxial region thereof.

In another general aspect, an optical imaging system includes a first lens, a second lens, a third lens, a fourth lens, a fifth lens, a sixth lens, a seventh lens, an eighth lens, a ninth lens, a tenth lens, and an eleventh lens sequentially arranged in ascending numerical order along an optical axis of the optical imaging system from an object side of the optical imaging system toward an imaging surface of the optical imaging system, wherein the tenth lens has a positive refractive power, and the eleventh lens has a negative refractive power, Nv24≥3 is satisfied, where Nv24 is a number of lenses among the first to eleventh lenses having an Abbe number of less than 24, and TTL/(2×IMG HT)<0.660 is satisfied, where TTL is a distance along the optical axis from an object-side surface of the first lens to the imaging surface, and IMG HT is one half of a diagonal length of the imaging surface.

Nv50≥5 may be satisfied, where Nv50 is a number of lenses among the first to eleventh lenses having an Abbe number of less than 50.

Each of the first to fifth, ninth, and tenth lenses may have a convex object-side surface in a paraxial region thereof, and a concave image-side surface in a paraxial region thereof.

The sixth lens may have a concave object-side surface in a paraxial region thereof, and a convex image-side surface in a paraxial region thereof.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
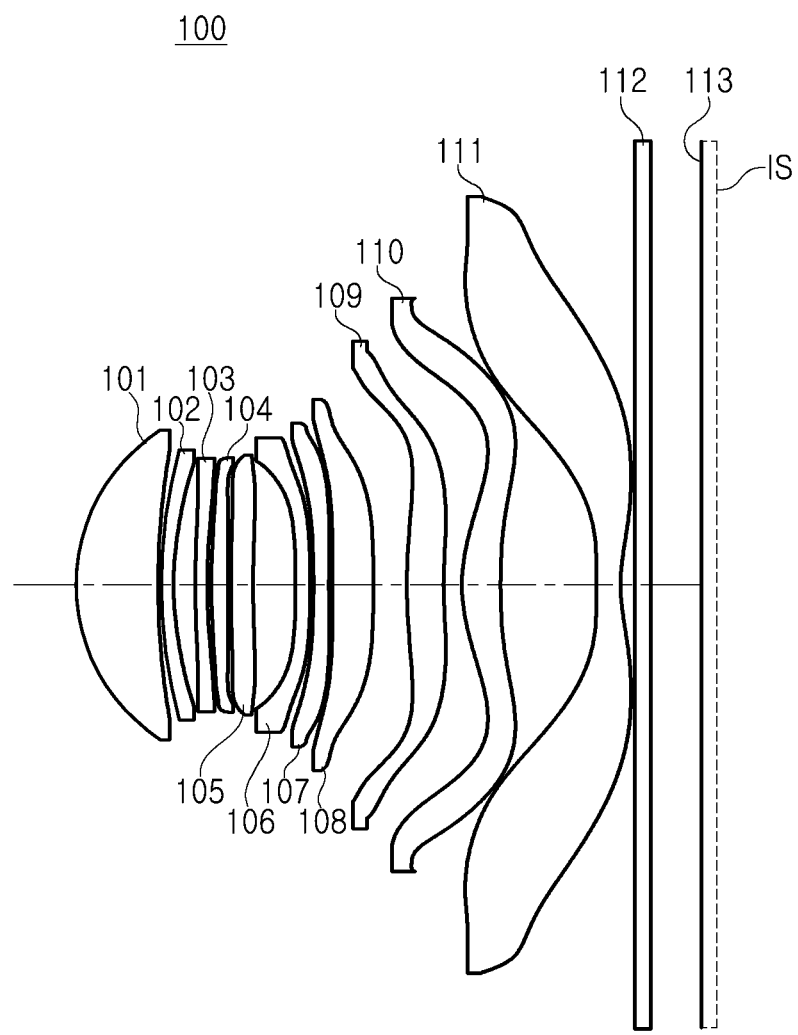
FIG. 1 is a structural view of an optical imaging system according to a first embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above"

or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

In the structural views of the optical imaging systems in the drawings, the thickness, size, and shape of the lenses may be somewhat exaggerated for ease of description, and specifically, the shape of a spherical or non-spherical surface of a lens shown in the structural views is only presented as an example, but is not limited thereto.

An optical imaging system according to an embodiment of the present disclosure includes eleven lenses.

A first lens refers to the lens closest to an object side of the optical imaging system, and an eleventh lens refers to the lens closest to an imaging surface (or an image sensor or an image side) of the optical imaging system.

Additionally, for each lens, a first surface denotes a side closest to the object side of the optical imaging system (or an object-side surface), and a second surface denotes a side closest to an image side of the optical imaging surface (or an image-side surface). Additionally, in the one or more examples, the values of the radiuses of curvature, thicknesses, distances, effective radiuses, and focal lengths of the lenses as well as the image height IMG HT are expressed in millimeters (mm), and the fields of view (FOV) are expressed in degrees.

Additionally, in the description of the shape of each lens, a statement that a surface of a lens is convex means that the surface is convex in a paraxial region of the surface, and a statement that a surface of a lens is concave means that the surface is concave in a paraxial region of the surface.

Accordingly, even if a surface of a lens is described as having a convex shape, an edge portion of the surface may have a concave shape. Similarly, even if a surface of a lens is described as having a concave shape, an edge portion of the surface may have a convex shape.

A paraxial region of a lens surface is a central portion of the lens surface surrounding the optical axis of the lens surface in which light rays incident to the lens surface make a small angle $\theta$ to the optical axis, and the approximations $\sin \theta \approx \theta$, $\tan \theta \approx \theta$, and $\cos \theta \approx 1$ are valid.

The imaging surface may be a virtual surface on which an image is focused by the optical imaging system. Alternatively, the imaging surface may be a surface of an image sensor on which light is received.

An optical imaging system according to an embodiment of the present disclosure includes at least eleven lenses.

For example, an optical imaging system according to an embodiment of the present disclosure includes a first lens, a second lens, a third lens, a fourth lens, a fifth lens, a sixth lens, a seventh lens, an eighth lens, a ninth lens, a tenth lens, and an eleventh lens sequentially arranged in ascending numerical order along an optical axis of the optical imaging system from an object side of the optical imaging system toward an image side of the optical imaging system. The first to eleventh lenses are spaced apart from each other by respective predetermined distances along the optical axis.

An optical imaging system according to an embodiment of the present disclosure may further include an image sensor that converts an image of an object focused on the image sensor into an electrical signal.

Additionally, the optical imaging system may further include an infrared filter (hereinafter referred to as a "filter") for blocking infrared rays. The filter may be disposed between the eleventh lens and the image sensor.

Additionally, the optical imaging system may further include an aperture that adjusts an amount of light that is incident on the image sensor.

The first to eleventh lenses constituting the optical imaging system according to an embodiment of the present disclosure may be made of a plastic material.

Additionally, any one or any combination of any two or more of the first to eleventh lenses may have at least one aspherical surface. For example, each of the first to eleventh lenses may have at least one aspherical surface.

That is, either one of the first surface and the second surface of each of the first to eleventh lenses may be an aspherical surface. The aspherical surfaces of the first to eleventh lenses are represented by Equation 1 below.

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + JY^{20} + LY^{22} + MY^{24} + NY^{26} + OY^{28} + PY^{30} \quad (1)$$

In Equation 1, c is a curvature of the lens and is equal to a reciprocal of a radius of curvature of the lens surface at an optical axis of the lens surface, K is a conic constant, and Y is a distance from any point on the aspherical surface of the lens to the optical axis. Additionally, constants A to H, J, and L to P are aspherical coefficients. Furthermore, Z (also known as sag) is a distance in a direction parallel to an optical axis direction between the point on the aspherical surface of the lens at the distance Y from the optical axis of the aspherical surface to a tangential plane perpendicular to the optical axis and intersecting a vertex of the aspherical surface.

The optical imaging system according to an embodiment of the present disclosure may satisfy any one or any combination of any two or more of the following Conditional Expressions 1 to 12.

| | |
|---|---|
| $TTL/(2 \times IMG\ HT) < 0.660$ | (Conditional Expression 1) |
| $Fno < 1.70$ | (Conditional Expression 2) |
| $D15/L1S1E < 1.200$ | (Conditional Expression 3) |
| $Nv50 \geq 5$ | (Conditional Expression 4) |
| $Nv24 \geq 3$ | (Conditional Expression 5) |
| $30 < v1-v2 < 45$ | (Conditional Expression 6) |
| $30 < v1-v3 < 45$ | (Conditional Expression 7) |
| $30 < v1-v6 < 45$ | (Conditional Expression 8) |
| $30 < v1-v7 < 45$ | (Conditional Expression 9) |
| $15 < v1-v9 < 25$ | (Conditional Expression 10) |

$f345/f1>6$  (Conditional Expression 11)

$4<|f678|/f1<7$  (Conditional Expression 12)

In the above conditional expressions, f1 is a focal length of the first lens, f345 is a composite focal length of the third lens, the fourth lens, and the fifth lens, and f678 is a composite focal length of the sixth lens, the seventh lens, and the eighth lens.

v1 is an Abbe number of the first lens, v2 is an Abbe number of the second lens, v3 is an Abbe number of the third lens, v6 is an Abbe number of the sixth lens, v7 is an Abbe number of the seventh lens, and v9 is an Abbe number of the ninth lens.

Nv50 is a number of lenses among the first to eleventh lenses having an Abbe number of less than 50, and Nv24 is a number of lenses among the first to eleventh lenses having an Abbe number of less than 24.

TTL is a distance on the optical axis from the object-side surface of the first lens to the imaging surface, and IMG HT is one half of a diagonal length of the imaging surface.

D15 is a distance on the optical axis from the object-side surface of the first lens to the image-side surface of the fifth lens, and L1S1E is an effective radius of the object-side surface of the first lens.

Fno is f-number of the optical imaging system.

An effective aperture radius of a lens surface is a radius of a portion of the lens surface through which light actually passes, and is not necessarily a radius of an outer edge of the lens surface. Stated another way, an effective aperture radius of a lens surface is a distance in a direction perpendicular to an optical axis of the lens surface between the optical axis and a marginal ray of light passing through the lens surface. The object-side surface of a lens and the image-side surface of the lens may have different effective aperture radiuses.

The first lens has a positive refractive power. Additionally, the first lens may have a meniscus shape convex toward the object side. Additionally, a first surface of the first lens may have a shape convex in the paraxial region, and a second surface of the first lens may have a shape concave in the paraxial region.

The second lens has a negative refractive power. Additionally, the second lens may have a meniscus shape convex toward the object side. Additionally, the first surface of the second lens may have a shape convex in the paraxial region, and the second surface of the second lens may have a shape concave in the paraxial region.

The third lens has a positive or negative refractive power. Additionally, the third lens may have a meniscus shape convex toward the object side. Additionally, a first surface of the third lens may have a shape convex in the paraxial region, and a second surface of the third lens may have a shape concave in the paraxial region.

The fourth lens has a positive or negative refractive power. Additionally, the fourth lens may have a meniscus shape convex toward the object side. Additionally, a first surface of the fourth lens may have a shape convex in the paraxial region, and a second surface of the fourth lens may have a shape concave in the paraxial region.

The fifth lens has a positive or negative refractive power. Additionally, the fifth lens may have a meniscus shape convex toward the object side. Additionally, a first surface of the fifth lens may have a shape convex in the paraxial region, and a second surface of the fifth lens may have a shape concave in the paraxial region.

The sixth lens has a positive or negative refractive power. Additionally, a sixth lens may have a meniscus shape convex toward the image side. Additionally, a first surface of the sixth lens may have a shape concave in the paraxial region, and a second surface of the sixth lens may have a shape convex in the paraxial region.

The seventh lens has a positive or negative refractive power. Additionally, the seventh lens may have a shape in which both surfaces thereof are concave. Additionally, a first surface and a second surface of the seventh lens may have a shape concave in the paraxial region.

Alternatively, the seventh lens may have a meniscus shape convex toward the image side. Additionally, the first surface of the seventh lens may have a shape concave in the paraxial region, and the second surface of the seventh lens may have a shape convex in the paraxial region.

The eighth lens has a positive or negative refractive power. Additionally, the eighth lens may have a shape in which both surfaces thereof are convex. Additionally, a first surface and a second surface of the eighth lens may have a shape convex in the paraxial region.

Alternatively, the eighth lens may have a meniscus shape convex toward the image side. Additionally, the first surface of the eighth lens may have a shape concave in the paraxial region, and the second surface of the eighth lens may have a shape convex in the paraxial region.

The ninth lens has a positive or negative refractive power. Additionally, the ninth lens may have a meniscus shape convex toward the object side. Additionally, a first surface of the ninth lens may have a shape convex in the paraxial region, and a second surface of the ninth lens may have a shape concave in the paraxial region.

Additionally, the ninth lens may have at least one inflection point formed on either one or both of the first surface and the second surface. For example, the first surface of the ninth lens may have a shape convex in the paraxial region, and may have a shape concave in a portion other than the paraxial region. The second surface of the ninth lens may have a shape concave in the paraxial region, and may have a shape convex in a portion other than the paraxial region.

The tenth lens has a positive refractive power. Additionally, the tenth lens may have a meniscus shape convex toward the object side. Additionally, a first surface of the tenth lens may have a shape convex in the paraxial region, and a second surface of the tenth lens may have a shape concave in the paraxial region.

Additionally, the tenth lens may have at least one inflection point formed on either one or both of the first surface and the second surface. For example, the first surface of the tenth lens may have a shape convex in the paraxial region, and may have a shape concave in a portion other than the paraxial region. The second surface of the tenth lens may have a shape concave in the paraxial region, and may have a shape convex in a portion other than the paraxial region.

The eleventh lens has a negative refractive power. Additionally, the eleventh lens may have a shape in which both surfaces thereof are concave. Additionally, a first surface and a second surface of the eleventh lens may have a shape concave in the paraxial region.

Alternatively, the eleventh lens may have a meniscus shape convex toward the object side. Additionally, the first surface of the eleventh lens may have a shape convex in the paraxial region, and the second surface of the eleventh lens may have a shape concave in the paraxial region.

Additionally, the eleventh lens may have at least one inflection point formed on either one or both of the first surface and the second surface. For example, the first surface of the first lens may have a shape concave in the paraxial region, and may have a shape convex in a portion other than the paraxial region. Alternatively, the first surface of the first lens may have a shape convex in the paraxial region, and may have a shape concave in a portion other than the paraxial region. The second surface of the eleventh lens may have a shape concave in the paraxial region, and may have a shape convex in a portion other than the paraxial region.

Each of at least two lenses sequentially arranged along the optical axis may have an Abbe number of less than 38. For example, each of at least two lenses sequentially arranged along the optical axis among the first to fourth lenses may have an Abbe number of less than 38. Also, each of at least two lenses sequentially arranged along the optical axis among the fifth to ninth lenses may have an Abbe number of less than 38.

Additionally, among the second lens to the seventh lens, at least two lenses sequentially arranged along the optical axis may have an Abbe number of less than 24.

An average value of a refractive index of the second lens and a refractive index of the third lens may be greater than 1.61.

At least one of the third lens to the fifth lens may have a refractive index of greater than 1.56 and an Abbe number of less than 38.

At least one of the sixth lens to the eighth lens may have a refractive index of greater than 1.67 and an Abbe number of less than 20.

An absolute value of the focal length of the second lens may be greater than an absolute value of the focal length of the first lens. For example, an absolute value of the focal length of the second lens may be greater than twice and less than four times an absolute value of the focal length of the first lens.

A composite focal length of the third lens, the fourth lens, and the fifth lens may have a positive value. Additionally, a composite focal length of the third lens, the fourth lens, and the fifth lens may be greater than an absolute value of the focal length of the second lens. For example, a composite focal length of the third lens, the fourth lens, and the fifth lens may be greater than twice and less than six times an absolute value of the focal length of the second lens.

A composite focal length of the sixth lens, the seventh lens, and the eighth lens may have a negative value. Additionally, an absolute value of the composite focal length of the sixth lens, the seventh lens, and the eighth lens may be less than a focal length of each of the third lens, the fourth lens, and the fifth lens. For example, an absolute value of the composite focal length of the sixth lens, the seventh lens, and the eighth lens may be greater than 0.2 times and less than 1 times the focal length of each of the third lens, the fourth lens, and the fifth lens.

The optical imaging system according to an embodiment of the present disclosure may have a field of view greater than 80°. In an embodiment, the field of view of the optical imaging system may be less than 88°.

Figure 2:
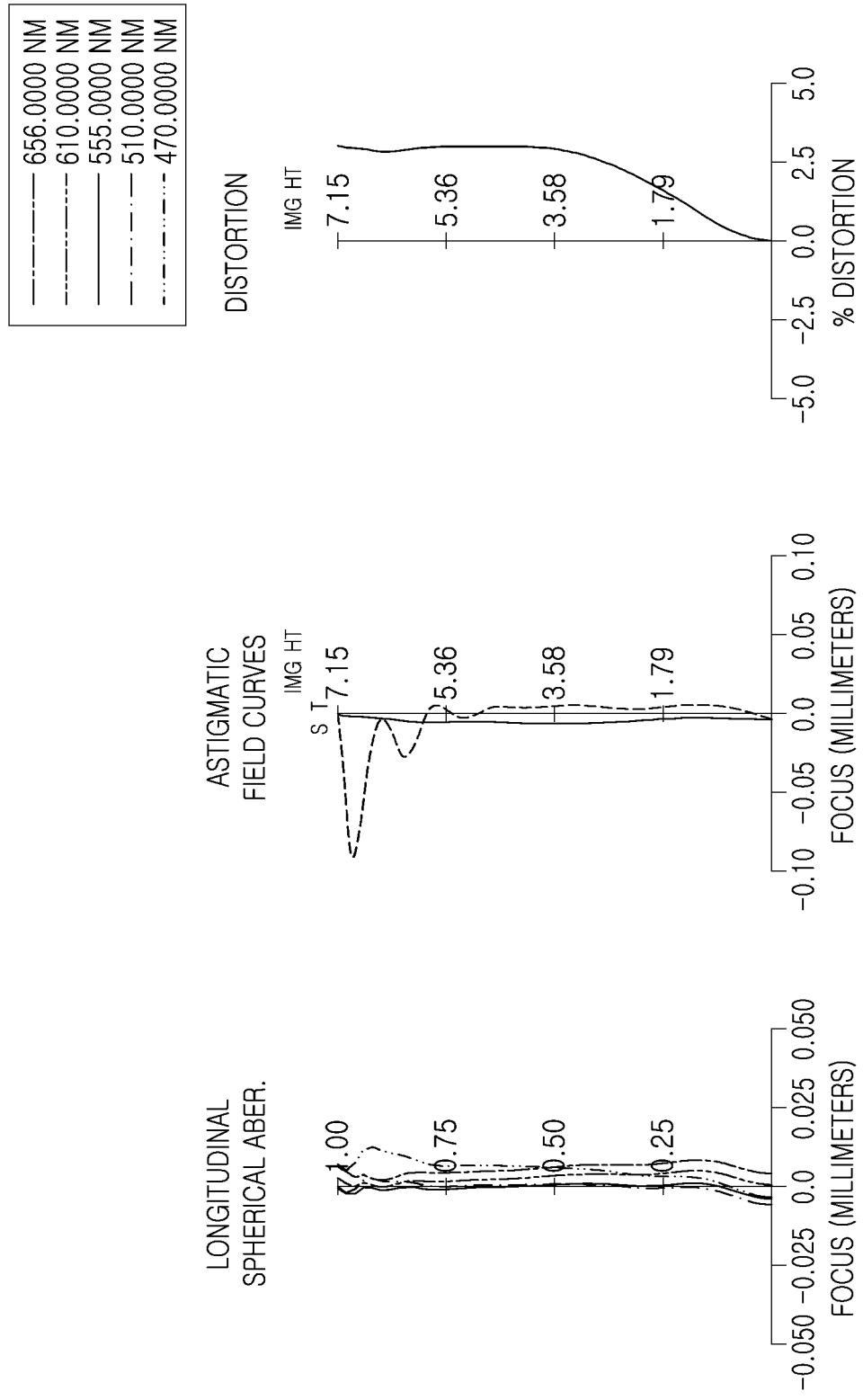
FIG. 2 is a view illustrating aberration characteristics of the optical imaging system illustrated in FIG. 1.

FIG. 1 is a structural view of an optical imaging system according to a first embodiment of the present disclosure, and FIG. 2 is a view illustrating aberration characteristics of the optical imaging system illustrated in FIG. 1.

Referring to FIGS. 1 and 2, an optical imaging system 100 according to the first embodiment of the present disclosure may include a first lens 101, a second lens 102, a third lens 103, a fourth lens 104, a fifth lens 105, a sixth lens 106, a seventh lens 107, an eighth lens 108, a ninth lens 109, a tenth lens 110, and, an eleventh lens 111, and may further include a filter 112 and an image sensor IS.

The optical imaging system 100 according to the first embodiment of the present disclosure may focus an image on an imaging surface 113. The imaging surface 113 may be a surface on which an image is focused by the optical imaging system 100. For example, the imaging surface 113 may be a surface of the image sensor IS on which light is received.

An aperture (not shown) may be disposed between the second lens 102 and the third lens 103.

The lens characteristics of each lens (a radius of curvature the first surface, a radius of curvature of the second surface, a thickness of the lens or a distance between the lens and the next lens, a refractive index, an Abbe number, an effective radius, and a focal length) are illustrated in Table 1 below.

TABLE 1

| Surface Number | Element | Radius of Curvature | Thickness/ Distance | Refractive Index | Abbe Number | Effective Radius | Focal Length |
|---|---|---|---|---|---|---|---|
| S1 | First | 3.213 | 1.222 | 1.546 | 55.99 | 2.371 | 7.2616 |
| S2 | Lens | 14.690 | 0.050 | | | 2.150 | |
| S3 | Second | 8.108 | 0.180 | 1.667 | 20.38 | 2.065 | −24.305 |
| S4 | Lens | 5.356 | 0.322 | | | 1.959 | |
| S5 (Stop) | Third | 12.342 | 0.180 | 1.677 | 19.24 | 1.925 | −53.5237 |
| S6 | Lens | 9.152 | 0.062 | | | 1.933 | |
| S7 | Fourth | 12.978 | 0.242 | 1.546 | 55.99 | 1.940 | 35.6195 |
| S8 | Lens | 38.779 | 0.051 | | | 1.950 | |
| S9 | Fifth | 24.782 | 0.332 | 1.546 | 55.99 | 1.980 | −1829.52 |
| S10 | Lens | 24.067 | 0.629 | | | 1.993 | |
| S11 | Sixth | −18.461 | 0.220 | 1.677 | 19.24 | 1.998 | 56.0539 |
| S12 | Lens | −12.479 | 0.050 | | | 2.257 | |
| S13 | Seventh | −12.358 | 0.228 | 1.667 | 20.38 | 2.354 | −14.5477 |
| S14 | Lens | 45.353 | 0.050 | | | 2.494 | |
| S15 | Eighth | 84.684 | 0.614 | 1.570 | 37.40 | 2.675 | 39.9309 |
| S16 | Lens | −31.037 | 0.502 | | | 2.880 | |
| S17 | Ninth | 9.989 | 0.546 | 1.570 | 37.40 | 3.505 | −39.0747 |
| S18 | Lens | 6.759 | 0.275 | | | 3.769 | |
| S19 | Tenth | 2.831 | 0.576 | 1.546 | 55.99 | 4.217 | 6.4349 |
| S20 | Lens | 13.542 | 1.431 | | | 4.434 | |
| S21 | Eleventh | −223.612 | 0.360 | 1.537 | 55.74 | 5.560 | −5.4483 |
| S22 | Lens | 2.964 | 0.208 | | | 6.006 | |
| S23 | Filter | Infinity | 0.245 | | | 6.923 | |
| S24 | | Infinity | 0.755 | | | 7.000 | |
| S25 | Imaging Surface | Infinity | | | | 7.151 | |

In an example, a total focal length f of the optical imaging system 100 according to the first embodiment of the present disclosure is 7.594 mm, Fno is 1.69, IMG HT is 7.15 mm, and FOV is 84.839°.

In the first embodiment of the present disclosure, the first lens 101 has a positive refractive power, a first surface of the first lens 101 has a shape convex in the paraxial region, and a second surface of the first lens 101 has a shape concave in the paraxial region.

The second lens 102 has a negative refractive power, a first surface of the second lens 102 has a shape convex in the paraxial region, and a second surface of the second lens 102 has a shape concave in the paraxial region.

The third lens 103 has a negative refractive power, a first surface of the third lens 103 has a shape convex in the paraxial region, and a second surface of the third lens 103 has a shape concave in the paraxial region.

The fourth lens 104 has a positive refractive power, a first surface of the fourth lens 104 has a shape convex in the paraxial region, and a second surface of the fourth lens 104 has a shape concave in the paraxial region.

The fifth lens 105 has a negative refractive power, a first surface of the fifth lens 105 has a shape convex in the paraxial region, and a second surface of the fifth lens 105 has a shape concave in the paraxial region.

The sixth lens 106 has a positive refractive power, a first surface of the sixth lens 106 has a shape concave in the paraxial region, and a second surface of the sixth lens 106 has a shape convex in the paraxial region.

The seventh lens 107 has a negative refractive power, and a first surface and a second surface of the seventh lens 107 have a shape concave in the paraxial region.

The eighth lens 108 has a positive refractive power, and a first surface and a second surface of the eighth lens 108 have a shape convex in the paraxial region.

The ninth lens 109 has a negative refractive power, a first surface of the ninth lens 109 has a shape convex in the paraxial region, and a second surface of the ninth lens 109 has a shape concave in the paraxial region.

The tenth lens 110 has a positive refractive power, a first surface of the tenth lens 110 has a shape convex in the paraxial region, and a second surface of the tenth lens 110 has a shape concave in the paraxial region.

The eleventh lens 111 has a negative refractive power, and a first surface and a second surface of the eleventh lens 111 have a shape concave in the paraxial region.

Any one or any combination of any two or more of the ninth lens 109 to the eleventh lens 111 has at least one inflection point formed on either one or both of the first and second surfaces.

Each surface of each of the first lens 101 to the eleventh lens 111 has aspherical coefficients as illustrated in Table 2 below. For example, both the object-side surface and the image-side surface of each of the first lens 101 to the eleventh lens 111 are aspherical surfaces.

TABLE 2

| | S1 | S2 | S3 | S4 | S5 | S6 | S7 | S8 |
|---|---|---|---|---|---|---|---|---|
| Conic Constant (K) | −3.376E−01 | 1.345E+01 | −1.764E+01 | −8.239E+00 | −1.425E+01 | −8.016E+01 | −9.591E+01 | −9.900E+01 |
| Fourth Coefficient (A) | 1.628E−03 | 4.698E−03 | 9.218E−04 | −2.966E−03 | −1.461E−02 | 5.036E−04 | 3.253E−03 | −3.679E−03 |
| Sixth Coefficient (B) | 1.948E−03 | −6.982E−03 | −7.619E−03 | −2.915E−03 | 4.404E−03 | 1.376E−03 | 1.379E−03 | −5.435E−03 |
| Eighth Coefficient (C) | −4.660E−03 | 4.413E−03 | 8.473E−03 | 8.907E−03 | 9.986E−04 | −6.147E−03 | −2.175E−02 | −2.885E−03 |
| Tenth Coefficient (D) | 7.515E−03 | 1.184E−03 | −6.402E−03 | −1.819E−02 | −8.200E−03 | 1.842E−02 | 6.392E−02 | 1.508E−02 |
| Twelfth Coefficient (E) | −7.927E−03 | −5.980E−03 | 4.250E−03 | 2.761E−02 | 1.310E−02 | −4.737E−02 | −1.312E−01 | −2.337E−02 |
| Fourteenth Coefficient (F) | 5.770E−03 | 7.063E−03 | −2.344E−03 | −2.898E−02 | −1.029E−02 | 8.222E−02 | 1.890E−01 | 2.638E−02 |
| Sixteenth Coefficient (G) | −2.984E−03 | −5.036E−03 | 9.598E−04 | 2.130E−02 | 3.152E−03 | −9.389E−02 | −1.902E−01 | −2.355E−02 |
| Eighteenth Coefficient (H) | 1.113E−03 | 2.443E−03 | −2.451E−04 | −1.112E−02 | 1.461E−03 | 7.210E−02 | 1.342E−01 | 1.600E−02 |
| Twentieth Coefficient (J) | −3.004E−04 | 8.332E−04 | 1.600E−05 | 4.140E−03 | −1.999E−03 | −3.789E−02 | −6.646E−02 | −7.863E−03 |
| Twenty-Second Coefficient (L) | 5.811E−05 | 2.001E−04 | 1.359E−05 | −1.089E−03 | 9.977E−04 | 1.367E−02 | 2.296E−02 | 2.698E−03 |
| Twenty-Fourth Coefficient (M) | −7.852E−06 | −3.315E−05 | −5.606E−06 | 1.974E−04 | −2.860E−04 | −3.332E−03 | −5.406E−03 | −6.249E−04 |
| Twenty-Sixth Coefficient (N) | 7.034E−07 | 3.606E−06 | 1.047E−06 | −2.340E−05 | 4.932E−05 | 5.242E−04 | 8.268E−04 | 9.283E−05 |
| Twenty-Eighth Coefficient (O) | −3.753E−08 | −2.318E−07 | −1.015E−07 | 1.627E−06 | −4.775E−06 | −4.804E−05 | −7.397E−05 | −7.986E−06 |
| Thirtieth Coefficient (P) | 9.025E−10 | 6.672E−09 | 4.127E−09 | −5.012E−08 | 2.002E−07 | 1.948E−06 | 2.936E−06 | 3.031E−07 |

| | S9 | S10 | S11 | S12 | S13 | S14 | S15 | S16 |
|---|---|---|---|---|---|---|---|---|
| Conic Constant (K) | −9.669E+01 | 6.459E+01 | 7.417E+01 | 2.633E+01 | 1.682E+01 | 9.900E+01 | 9.900E+01 | 9.317E+01 |
| Fourth Coefficient (A) | −1.891E−03 | −6.719E−04 | 1.229E−03 | 7.150E−02 | 7.617E−02 | 2.823E−02 | 1.974E−02 | −3.639E−03 |
| Sixth Coefficient (B) | −4.122E−03 | −8.413E−03 | −4.243E−02 | −2.167E−01 | −2.441E−01 | −1.441E−01 | −1.061E−01 | −1.525E−02 |
| Eighth Coefficient (C) | 2.781E−03 | 2.457E−02 | 7.014E−02 | 3.829E−01 | 4.609E−01 | 2.713E−01 | 1.742E−01 | 9.625E−03 |

TABLE 2-continued

| | | | | | | | | |
|---|---|---|---|---|---|---|---|---|
| Tenth Coefficient (D) | −7.721E−03 | −5.290E−02 | −9.960E−02 | −4.821E−01 | −5.865E−01 | −3.162E−01 | −1.783E−01 | −2.891E−03 |
| Twelfth Coefficient (E) | 2.526E−02 | 7.796E−02 | 1.115E−01 | 4.307E−01 | 5.142E−01 | 2.495E−01 | 1.257E−01 | −4.049E−04 |
| Fourteenth Coefficient (F) | −4.229E−02 | −8.099E−02 | −9.741E−02 | −2.773E−01 | −3.192E−01 | −1.396E−01 | −6.335E−02 | 9.390E−04 |
| Sixteenth Coefficient (G) | 4.275E−02 | 6.024E−02 | 6.571E−02 | 1.308E−01 | 1.434E−01 | 5.673E−02 | 2.324E−02 | −5.340E−04 |
| Eighteenth Coefficient (H) | −2.860E−02 | −3.239E−02 | −3.378E−02 | −4.568E−02 | −4.720E−02 | −1.697E−02 | −6.260E−03 | 1.825E−04 |
| Twentieth Coefficient (J) | 1.317E−02 | 1.261E−02 | 1.304E−02 | 1.180E−02 | 1.139E−02 | 3.738E−03 | 1.239E−03 | −4.178E−05 |
| Twenty-Second Coefficient (L) | −4.212E−03 | −3.513E−03 | −3.701E−03 | −2.224E−03 | −1.995E−03 | −6.003E−04 | −1.786E−04 | 6.533E−06 |
| Twenty-Fourth Coefficient (M) | 9.214E−04 | 6.831E−04 | 7.478E−04 | 2.969E−04 | 2.465E−04 | 6.839E−05 | 1.825E−05 | −6.876E−07 |
| Twenty-Sixth Coefficient (N) | −1.316E−04 | −8.803E−05 | −1.016E−04 | −2.655E−05 | −2.036E−05 | −5.242E−06 | −1.255E−06 | 4.647E−08 |
| Twenty-Eighth Coefficient (O) | 1.106E−05 | 6.754E−06 | 8.323E−06 | 1.423E−06 | 1.009E−06 | 2.425E−07 | 5.208E−08 | −1.816E09 |
| Thirtieth Coefficient (P) | −4.137E−07 | −2.335E−07 | −3.101E−07 | −3.447E−08 | −2.268E−08 | −5.119E−09 | −9.859E−10 | 3.110E−11 |

| | S17 | S18 | S19 | S20 | S21 | S22 |
|---|---|---|---|---|---|---|
| Conic Constant (K) | −1.278E+01 | −8.768E+01 | −1.139E+01 | −1.756E+01 | 9.900E+01 | −1.174E+01 |
| Fourth Coefficient (A) | −4.325E−03 | −2.273E−02 | 2.391E−02 | 2.299E−02 | −8.182E−02 | −3.887E−02 |
| Sixth Coefficient (B) | 1.078E−04 | −1.675E−03 | −2.026E−02 | −7.536E−03 | 2.908E−02 | 1.294E−02 |
| Eighth Coefficient (C) | −1.591E−03 | 6.321E−03 | 1.058E−02 | 1.008E−03 | −7.960E−03 | −3.170E−03 |
| Tenth Coefficient (D) | 1.530E−03 | −4.432E−03 | −4.527E−03 | −1.932E−04 | 1.615E−03 | 5.551E−04 |
| Twelfth Coefficient (E) | −8.430E−04 | 1.959E−03 | 1.431E−03 | 8.124E−05 | −2.393E−04 | −7.038E−05 |
| Fourteenth Coefficient (F) | 3.017E−04 | −6.171E−04 | −3.257E−04 | −2.457E−05 | 2.619E−05 | 6.535E−06 |
| Sixteenth Coefficient (G) | −7.428E−05 | 1.415E−04 | 5.320E−05 | 4.562E−06 | −2.126E−06 | −4.478E−07 |
| Eighteenth Coefficient (H) | 1.280E−05 | −2.369E−05 | −6.241E−06 | −5.475E−07 | 1.278E−07 | 2.272E−08 |
| Twentieth Coefficient (J) | −1.540E−06 | 2.874E−06 | 5.245E−07 | 4.377E−08 | −5.641E−09 | −8.512E−10 |
| Twenty-Second Coefficient (L) | 1.269E−07 | −2.486E−07 | −3.118E−08 | −2.333E−09 | 1.800E−10 | 2.323E−11 |
| Twenty-Fourth Coefficient (M) | −6.858E−09 | 1.488E−08 | 1.278E−09 | 8.051E−11 | −4.032E−12 | −4.491E−13 |
| Twenty-Sixth Coefficient (N) | 2.232E−10 | −5.837E−10 | −3.425E−11 | −1.675E−12 | 6.009E−14 | 5.826E−15 |
| Twenty-Eighth Coefficient (O) | −3.604E−12 | 1.348E−11 | 5.399E−13 | 1.786E−14 | −5.346E−16 | −4.545E−17 |
| Thirtieth Coefficient (P) | 1.483E−14 | −1.387E−13 | −3.790E−15 | −6.028E−17 | 2.148E−18 | 1.611E−19 |

Additionally, the optical imaging system 100 described above may have the aberration characteristics illustrated in FIG. 2.

Figure 3:
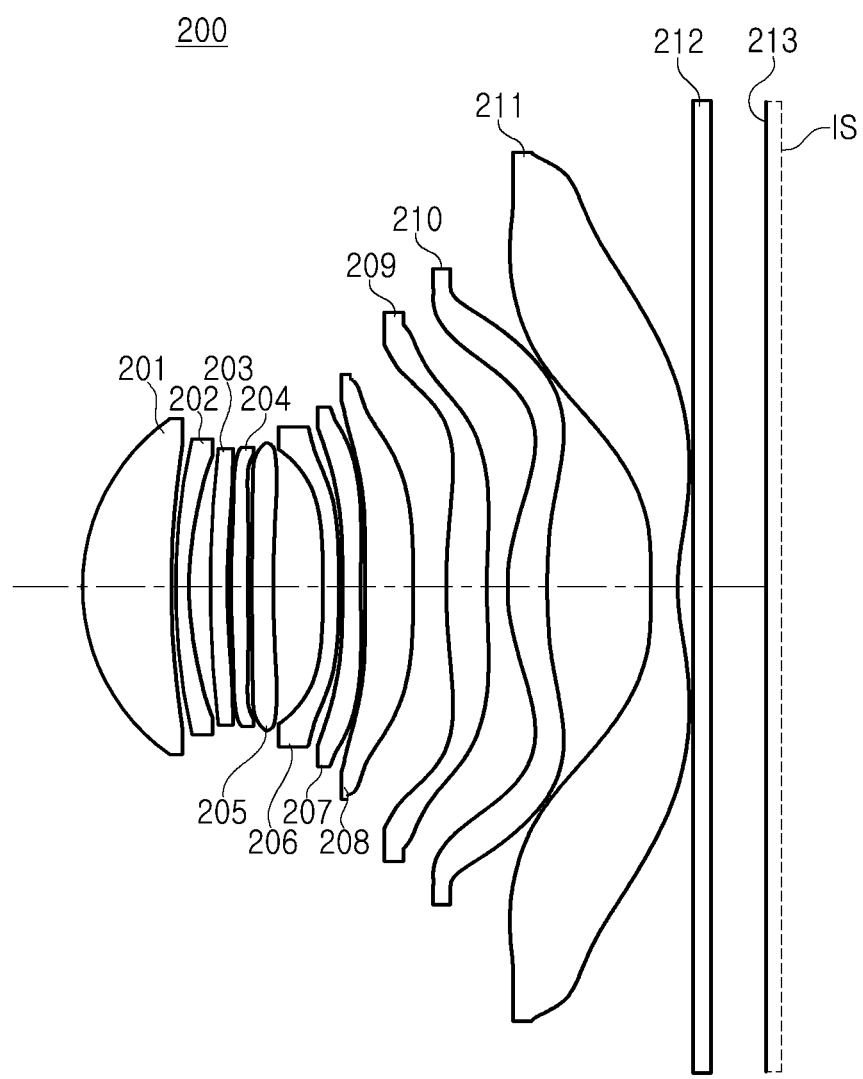
FIG. 3 is a structural view of an optical imaging system according to a second embodiment of the present disclosure.
Figure 4:
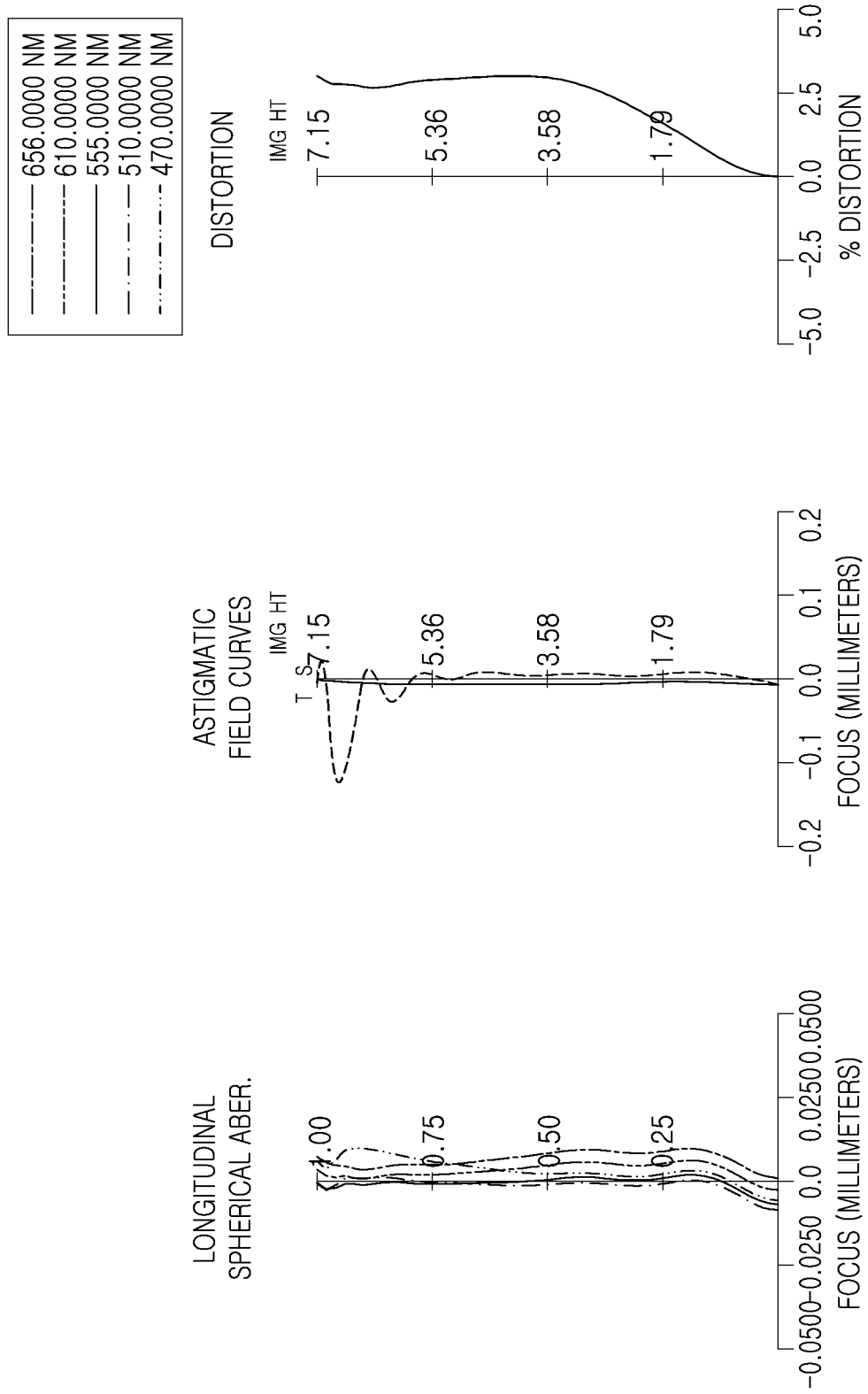
FIG. 4 is a view illustrating aberration characteristics of the optical imaging system illustrated in FIG. 3.

FIG. 3 is a structural view of an optical imaging system according to a second embodiment of the present disclosure, and FIG. 4 is a view illustrating aberration characteristics of the optical imaging system illustrated in FIG. 3.

Referring to FIGS. 3 and 4, an optical imaging system 200 according to the second embodiment of the present disclosure may include a first lens 201, a second lens 202, a third lens 203, a fourth lens 204, a fifth lens 205, a sixth lens 206, a seventh lens 207, an eighth lens 208, a ninth lens 209, a tenth lens 210, and an eleventh lens 211, and may further include a filter 212 and an image sensor IS.

The optical imaging system 200 according to the second embodiment of the present disclosure may focus an image on an imaging surface 213. The imaging surface 213 may be a surface on which an image is focused by the optical imaging system 200. For example, the imaging surface 213 may be a surface of the image sensor IS on which light is received.

An aperture (not shown) may be disposed between the second lens 202 and the third lens 203.

The lens characteristics of each lens (a radius of curvature of the first surface, a radius of curvature of the second surface, a thickness of the lens or a distance between the lens and the next lens, a refractive index, an Abbe number, an effective radius, and a focal length) are illustrated in Table 3 below.

TABLE 3

| Surface Number | Element | Radius of Curvature | Thickness/ Distance | Refractive Index | Abbe Number | Effective Radius | Focal Length |
|---|---|---|---|---|---|---|---|
| S1 | First | 3.213 | 1.219 | 1.546 | 55.99 | 2.358 | 7.2516 |
| S2 | Lens | 14.789 | 0.058 | | | 2.150 | |
| S3 | Second | 8.186 | 0.180 | 1.677 | 19.24 | 2.071 | −17.5089 |
| S4 | Lens | 4.799 | 0.291 | | | 1.941 | |
| S5 (Stop) | Third | 8.594 | 0.235 | 1.570 | 37.40 | 1.918 | 50 |
| S6 | Lens | 12.184 | 0.050 | | | 1.939 | |
| S7 | Fourth | 21.011 | 0.232 | 1.546 | 55.99 | 1.952 | 65.0457 |
| S8 | Lens | 51.276 | 0.050 | | | 1.960 | |
| S9 | Fifth | 31.946 | 0.296 | 1.570 | 37.40 | 2.000 | −74.7848 |
| S10 | Lens | 18.198 | 0.674 | | | 2.021 | |
| S11 | Sixth | −20.477 | 0.220 | 1.677 | 19.24 | 2.020 | 45.273 |
| S12 | Lens | −12.328 | 0.050 | | | 2.249 | |
| S13 | Seventh | −12.598 | 0.247 | 1.677 | 19.24 | 2.352 | −16.0349 |
| S14 | Lens | 79.072 | 0.061 | | | 2.514 | |
| S15 | Eighth | −465.171 | 0.652 | 1.537 | 55.74 | 2.727 | 58.829 |
| S16 | Lens | −29.576 | 0.451 | | | 2.956 | |
| S17 | Ninth | 9.175 | 0.548 | 1.570 | 37.40 | 3.569 | −59.3681 |
| S18 | Lens | 7.061 | 0.286 | | | 3.864 | |
| S19 | Tenth | 2.882 | 0.542 | 1.546 | 55.99 | 4.330 | 6.7840 |
| S20 | Lens | 12.131 | 1.417 | | | 4.452 | |
| S21 | Eleventh | −523.423 | 0.360 | 1.537 | 55.74 | 5.651 | −5.4607 |
| S22 | Lens | 2.947 | 0.211 | | | 6.096 | |
| S23 | Filter | Infinity | 0.245 | | | 6.944 | |
| S24 | | Infinity | 0.755 | | | 7.018 | |
| S25 | Imaging Surface | Infinity | | | | 7.150 | |

In an example, a focal length f of the optical imaging system 200 according to the second embodiment of the present disclosure is 7.5771 mm, Fno is 1.69, IMG HT is 7.15 mm, and FOV is 84.95°.

In the second embodiment of the present disclosure, the first lens 201 has a positive refractive power, a first surface of the first lens 201 has a shape convex in the paraxial region, and a second surface of the first lens 201 has a shape concave in the paraxial region.

The second lens 202 has a negative refractive power, a first surface of the second lens 202 has a shape convex in the paraxial region, and a second surface of the second lens 202 has a shape concave in the paraxial region.

The third lens 203 has a positive refractive power, the first surface of the third lens 203 has a shape convex in the paraxial region, and the second surface of the third lens 203 has a shape concave in the paraxial region.

The fourth lens 204 has a positive refractive power, a first surface of the fourth lens 204 has a shape convex in the paraxial region, and a second surface of the fourth lens 204 has a shape concave in the paraxial region.

The fifth lens 205 has a negative refractive power, a first surface of the fifth lens 205 has a shape convex in the paraxial region, and a second surface of the fifth lens 205 has a shape concave in the paraxial region.

The sixth lens 206 has a positive refractive power, a first surface of the sixth lens 206 has a shape concave in the paraxial region, and a second surface of the sixth lens 206 has a shape convex in the paraxial region.

The seventh lens 207 has a negative refractive power, and a first surface and a second surface of the seventh lens 207 have a shape concave in the paraxial region.

The eighth lens 208 has a positive refractive power, a first surface of the eighth lens 208 has a shape concave in the paraxial region, and a second surface of the eighth lens 208 has a shape convex in the paraxial region.

The ninth lens 209 has a negative refractive power, a first surface of the ninth lens 209 has a shape convex in the paraxial region, and a second surface of the ninth lens 209 has a shape concave in the paraxial region.

The tenth lens 210 has a positive refractive power, a first surface of the tenth lens 210 has a shape convex in the paraxial region, and a second surface of the tenth lens 210 has a shape concave in the paraxial region.

The eleventh lens 211 has a negative refractive power, and a first surface and a second surface of the eleventh lens 211 have a shape concave in the paraxial region.

Additionally, any one or any combination of any two or more of the ninth lens 209 to the eleventh lens 211 has at least one inflection point formed on either one or both of the first and second surfaces.

Each surface of each of the first lens 201 to the eleventh lens 211 has aspherical coefficients as illustrated in Table 4 below. For example, both the object-side surface and the image-side surface of each of the first lens 201 to the eleventh lens 211 are aspherical surfaces.

TABLE 4

| | S1 | S2 | S3 | S4 | S5 | S6 | S7 | S8 |
|---|---|---|---|---|---|---|---|---|
| Conic Constant (K) | −3.410E−01 | 9.653E+00 | −2.993E+01 | −8.772E+00 | −1.265E+01 | −9.883E+01 | −9.900E+01 | −1.221E+01 |
| Fourth Coefficient (A) | 1.530E−03 | 6.799E−03 | 1.134E−03 | −4.232E−03 | −1.026E−02 | 3.706E−03 | 8.473E−03 | −3.640E−03 |
| Sixth Coefficient (B) | 2.605E−03 | −1.189E−02 | −1.416E−02 | −6.854E−03 | −1.970E−03 | −1.483E−02 | −2.153E−02 | −2.276E−02 |
| Eighth Coefficient (C) | −5.791E−03 | 1.477E−02 | 2.582E−02 | 2.293E−02 | 8.253E−03 | 2.621E−02 | 3.164E−02 | 5.039E−02 |

TABLE 4-continued

| | | | | | | | | |
|---|---|---|---|---|---|---|---|---|
| Tenth Coefficient (D) | 8.661E−03 | −1.409E−02 | −3.312E−02 | −4.175E−02 | −1.225E−02 | −1.988E−02 | −2.324E−02 | −8.078E−02 |
| Twelfth Coefficient (E) | −8.596E−03 | 9.201E−03 | 3.196E−02 | 5.470E−02 | 1.376E−02 | −9.899E−03 | −1.313E−02 | 1.004E−01 |
| Fourteenth Coefficient (F) | 5.938E−03 | −3.674E−03 | −2.334E−02 | −5.226E−02 | −1.198E−02 | 4.560E−02 | 5.718E−02 | −9.360E−02 |
| Sixteenth Coefficient (G) | −2.931E−03 | 5.394E−04 | 1.299E−02 | 3.656E−02 | 7.612E−03 | −6.138E−02 | −7.621E−02 | 6.445E−02 |
| Eighteenth Coefficient (H) | 1.047E−03 | 2.935E−04 | −5.495E−03 | −1.869E−02 | −3.380E−03 | 4.956E−02 | 6.104E−02 | −3.253E−02 |
| Twentieth Coefficient (J) | −2.715E−04 | −2.193E−04 | 1.746E−03 | 6.936E−03 | 1.006E−03 | −2.656E−02 | −3.246E−02 | 1.197E−02 |
| Twenty-Second Coefficient (L) | 5.054E−05 | 7.209E−05 | −4.079E−04 | −1.838E−03 | −1.858E−04 | 9.668E−03 | 1.172E−02 | −3.186E−03 |
| Twenty-Fourth Coefficient (M) | −6.577E−06 | −1.424E−05 | 6.773E−05 | 3.378E−04 | 1.665E−05 | −2.364E−03 | −2.840E−03 | 6.013E−04 |
| Twenty-Sixth Coefficient (N) | 5.676E−07 | 1.734E−06 | −7.541E−06 | −4.073E−05 | 3.979E−07 | 3.717E−04 | 4.423E−04 | 7.683E−05 |
| Twenty-Eighth Coefficient (O) | −2.915E−08 | −1.205E−07 | 5.035E−07 | 2.881E−06 | −2.202E−07 | −3.390E−05 | −3.997E−05 | 5.986E−06 |
| Thirtieth Coefficient (P) | 6.733E−10 | 3.672E−09 | −1.521E−08 | −9.001E−08 | 1.378E−08 | 1.362E−06 | 1.592E−06 | −2.147E−07 |

| | S9 | S10 | S11 | S12 | S13 | S14 | S15 | S16 |
|---|---|---|---|---|---|---|---|---|
| Conic Constant (K) | −6.041E+01 | 5.699E+01 | 7.639E+01 | 2.611E+01 | 1.875E+01 | 9.900E+01 | −9.900E+01 | 9.128E+01 |
| Fourth Coefficient (A) | −7.379E−03 | −2.831E−03 | −2.775E−03 | 8.338E−02 | 9.972E−02 | 2.846E−02 | 6.758E−03 | −9.542E−03 |
| Sixth Coefficient (B) | −1.089E−02 | −7.910E−03 | −3.980E−02 | −2.584E−01 | −2.902E−01 | −1.171E−01 | −6.228E−02 | −6.054E−03 |
| Eighth Coefficient (C) | 3.336E−02 | 2.809E−02 | 6.378E−02 | 4.264E−01 | 4.740E−01 | 1.914E−01 | 1.000E−01 | 1.420E−03 |
| Tenth Coefficient (D) | −5.828E−02 | −5.911E−02 | −7.667E−02 | −4.962E−01 | −5.323E−01 | −1.997E−01 | −9.703E−02 | 2.240E−03 |
| Twelfth Coefficient (E) | 7.921E−02 | 8.346E−02 | 6.624E−02 | 4.233E−01 | 4.290E−01 | 1.422E−01 | 6.314E−02 | −2.754E−03 |
| Fourteenth Coefficient (F) | −8.195E−02 | −8.301E−02 | −4.165E−02 | −2.701E−01 | −2.541E−01 | −7.203E−02 | −2.900E−02 | 1.706E−03 |
| Sixteenth Coefficient (G) | 6.280E−02 | 5.910E−02 | 1.872E−02 | 1.300E−01 | 1.122E−01 | 2.662E−02 | 9.703E−03 | −6.946E−04 |
| Eighteenth Coefficient (H) | −3.522E−02 | −3.039E−02 | −5.799E−03 | −4.708E−02 | −3.711E−02 | −7.259E−03 | −2.406E−03 | 1.974E−04 |
| Twentieth Coefficient (J) | 1.433E−02 | 1.129E−02 | 1.153E−03 | 1.272E−02 | 9.136E−03 | 1.459E−03 | 4.445E−04 | −3.969E−05 |
| Twenty-Second Coefficient (L) | −4.176E−03 | −3.000E−03 | −1.211E−04 | −2.518E−03 | −1.648E−03 | −2.131E−04 | −6.066E−05 | 5.610E−06 |
| Twenty-Fourth Coefficient (M) | 8.481E−04 | 5.554E−04 | 4.229E−07 | 3.533E−04 | 2.110E−04 | 2.197E−05 | 5.951E−06 | −5.434E−07 |
| Twenty-Sixth Coefficient (N) | −1.140E−04 | −6.804E−05 | 1.252E−06 | −3.318E−05 | −1.814E−05 | −1.512E−06 | −3.973E−07 | 3.423E−08 |
| Twenty-Eighth Coefficient (O) | 9.101E−06 | 4.959E−06 | −8.353E−08 | 1.868E−06 | 9.381E−07 | 6.225E−08 | 1.614E−08 | −1.259E−09 |
| Thirtieth Coefficient (P) | −3.262E−07 | −1.630E−07 | −1.145E−09 | −4.757E−08 | −2.203E−08 | −1.157E−09 | −3.004E−10 | 2.049E−11 |

| | S17 | S18 | S19 | S20 | S21 | S22 |
|---|---|---|---|---|---|---|
| Conic Constant (K) | −1.705E+01 | −8.491E+01 | −1.131E+01 | −2.216E+01 | 5.411E+01 | −1.204E+01 |
| Fourth Coefficient (A) | −5.992E−03 | −2.475E−02 | 2.427E−02 | 2.405E−02 | −8.221E−02 | −3.744E−02 |
| Sixth Coefficient (B) | 2.347E−03 | 1.917E−03 | −2.098E−02 | −9.016E−03 | 2.920E−02 | 1.210E−02 |
| Eighth Coefficient (C) | −3.101E−03 | 3.119E−03 | 1.113E−02 | 1.925E−03 | −7.928E−03 | −2.836E−03 |
| Tenth Coefficient (D) | 2.272E−03 | −2.371E−03 | −4.827E−03 | −5.833E−04 | 1.587E−03 | 4.720E−04 |
| Twelfth Coefficient (E) | −1.131E−03 | 9.947E−04 | 1.548E−03 | 2.024E−04 | −2.315E−04 | −5.670E−05 |
| Fourteenth Coefficient (F) | 3.906E−04 | −2.934E−04 | −3.576E−04 | −5.205E−05 | 2.491E−05 | 4.973E−06 |
| Sixteenth Coefficient (G) | −9.543E−05 | 6.356E−05 | 5.934E−05 | 9.085E−06 | −1.989E−06 | −3.210E−07 |
| Eighteenth Coefficient (H) | 1.662E−05 | −1.017E−05 | −7.080E−06 | −1.085E−06 | 1.176E−07 | 1.532E−08 |
| Twentieth Coefficient (J) | −2.060E−06 | 1.188E−06 | 6.057E−07 | 8.960E−08 | −5.105E−09 | −5.392E−10 |
| Twenty-Second Coefficient (L) | 1.793E−07 | −9.939E−08 | −3.672E−08 | −5.098E−09 | 1.601E−10 | 1.385E−11 |

TABLE 4-continued

| | | | | | |
|---|---|---|---|---|---|
| Twenty-Fourth Coefficient (M) | −1.065E−08 | 5.752E−09 | 1.537E−09 | 1.955E−10 | −3.522E−12 | −2.527E−13 |
| Twenty-Sixth Coefficient (N) | 4.087E−10 | −2.177E−10 | −4.215E−11 | −4.808E−12 | 5.150E−14 | 3.109E−15 |
| Twenty-Eighth Coefficient (O) | −9.069E−12 | 4.835E−12 | 6.816E−13 | 6.809E−14 | −4.493E−16 | −2.315E−17 |
| Thirtieth Coefficient (P) | 8.771E−14 | −4.767E−14 | −4.923E−15 | −4.197E−16 | 1.769E−18 | 7.880E−20 |

Additionally, the optical imaging system 200 described above may have the aberration characteristics illustrated in FIG. 4 below.

Figure 5:
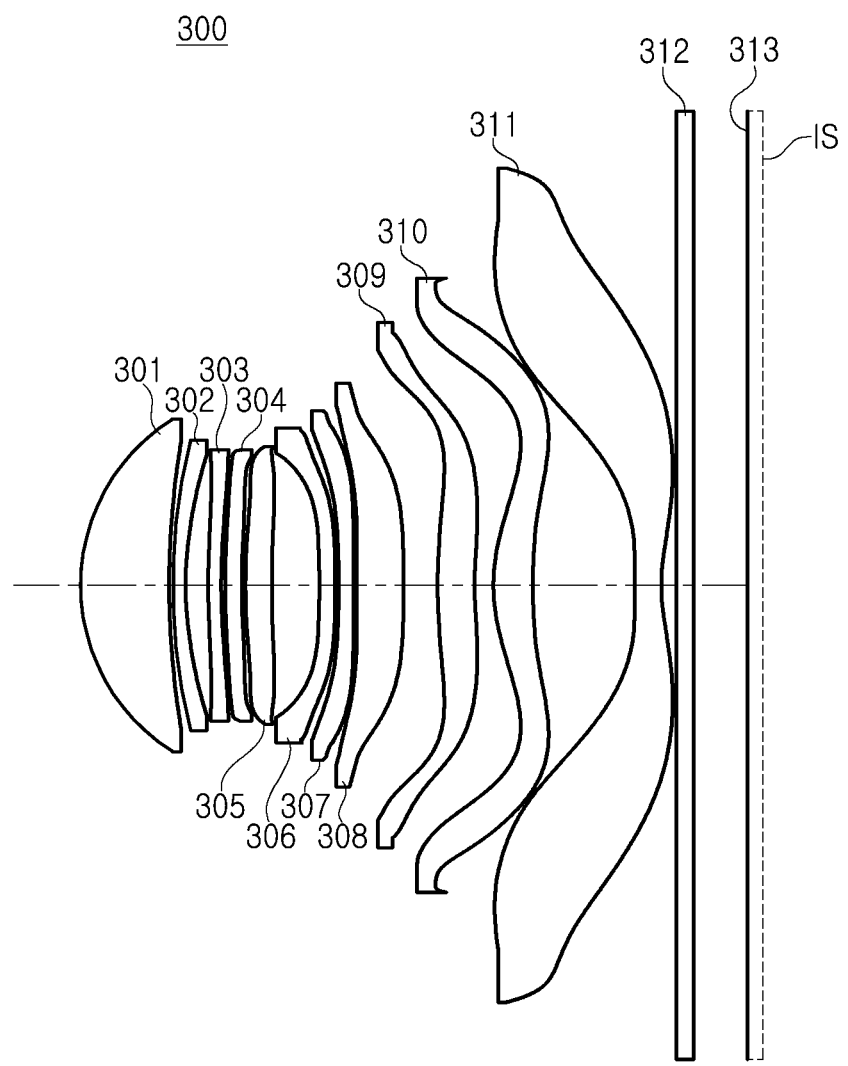
FIG. 5 is a structural view of an optical imaging system according to a third embodiment of the present disclosure.
Figure 6:
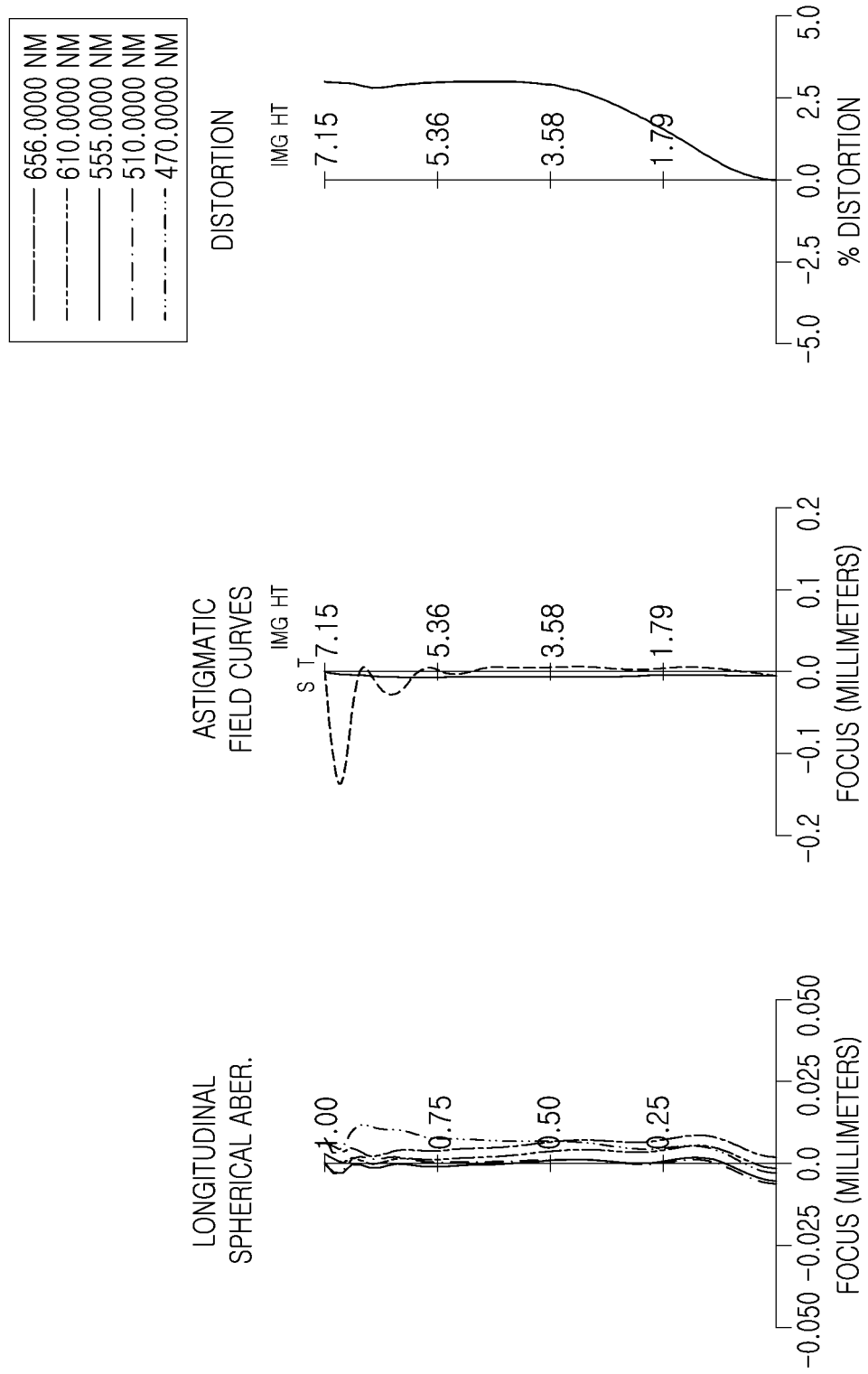
FIG. 6 is a view illustrating aberration characteristics of the optical imaging system illustrated in FIG. 5.

FIG. 5 is a structural view of an optical imaging system according to a third embodiment of the present disclosure, and FIG. 6 is a view illustrating aberration characteristics of the optical imaging system illustrated in FIG. 5.

Referring to FIGS. 5 and 6, an optical imaging system 300 according to the third embodiment of the present disclosure may include a first lens 301, a second lens 302, a third lens 303, a fourth lens 304, a fifth lens 305, a sixth lens 306, a seventh lens 307, an eighth lens 308, a ninth lens 309, a tenth lens 310, and an eleventh lens 311, and may further include a filter 312 and an image sensor IS.

The optical imaging system 300 according to the third embodiment of the present disclosure may focus an image on an imaging surface 313. The imaging surface 313 may be a surface on which an image is focused by the optical imaging system 300. For example, the imaging surface 313 may be a surface of the image sensor IS on which light is received.

An aperture (not shown) may be disposed between the second lens 302 and the third lens 303.

The lens characteristics of each lens (a radius of curvature of the first surface, a radius of curvature of the second surface, a thickness of the lens or a distance between the lens and the next lens, a refractive index, an Abbe number, an effective radius, and a focal length) are illustrated in Table 5 below.

In an example, a total focal length f of the optical imaging system 300 according to the third embodiment of the present disclosure is 7.6112 mm, Fno is 1.69, IMG HT is 7.15 mm, and FOV is 84.702°.

In the third embodiment of the present disclosure, the first lens 301 has a positive refractive power, a first surface of the first lens 301 has a shape convex in the paraxial region, and a second surface of the first lens 301 has a shape concave in the paraxial region.

The second lens 302 has a negative refractive power, a first surface of the second lens 302 has a shape convex in the paraxial region, and a second surface of the second lens 302 has a shape concave in the paraxial region.

The third lens 303 has a negative refractive power, a first surface of the third lens 303 has a shape convex in the paraxial region, and a second surface of the third lens 303 has a shape concave in the paraxial region.

The fourth lens 304 has a negative refractive power, a first surface of the fourth lens 304 has a shape convex in the paraxial region, and a second surface of the fourth lens 304 has a shape concave in the paraxial region.

The fifth lens 305 has a positive refractive power, a first surface of the fifth lens 305 has a shape convex in the paraxial region, and a second surface of the fifth lens 305 has a shape concave in the paraxial region.

The sixth lens 306 has a positive refractive power, a first surface of the sixth lens 306 has a shape concave in the paraxial region, and a second surface of the sixth lens 306 has a shape convex in the paraxial region.

TABLE 5

| Surface Number | Element | Radius of Curvature | Thickness/ Distance | Refractive Index | Abbe Number | Effective Radius | Focal Length |
|---|---|---|---|---|---|---|---|
| S1 | First | 3.200 | 1.243 | 1.546 | 55.99 | 2.380 | 7.1965 |
| S2 | Lens | 14.891 | 0.050 | | | 2.153 | |
| S3 | Second | 8.758 | 0.180 | 1.677 | 19.24 | 2.069 | −23.5551 |
| S4 | Lens | 5.606 | 0.316 | | | 1.964 | |
| S5 (Stop) | Third | 12.738 | 0.180 | 1.677 | 19.24 | 1.931 | −135.69 |
| S6 | Lens | 11.123 | 0.058 | | | 1.933 | |
| S7 | Fourth | 16.232 | 0.230 | 1.570 | 37.40 | 1.938 | −50 |
| S8 | Lens | 10.288 | 0.050 | | | 1.945 | |
| S9 | Fifth | 8.747 | 0.371 | 1.546 | 55.99 | 1.975 | 26.3664 |
| S10 | Lens | 21.968 | 0.665 | | | 1.992 | |
| S11 | Sixth | −17.654 | 0.220 | 1.677 | 19.24 | 1.998 | 57.4713 |
| S12 | Lens | −12.205 | 0.050 | | | 2.265 | |
| S13 | Seventh | −11.802 | 0.205 | 1.677 | 19.24 | 2.358 | −14.9962 |
| S14 | Lens | 73.121 | 0.052 | | | 2.509 | |
| S15 | Eighth | 277.032 | 0.652 | 1.570 | 37.40 | 2.734 | 46.9895 |
| S16 | Lens | −29.619 | 0.475 | | | 2.928 | |
| S17 | Ninth | 9.578 | 0.519 | 1.570 | 37.40 | 3.554 | −36.5362 |
| S18 | Lens | 6.431 | 0.260 | | | 3.818 | |
| S19 | Tenth | 2.772 | 0.553 | 1.546 | 55.99 | 4.234 | 6.3574 |
| S20 | Lens | 12.803 | 1.427 | | | 4.435 | |
| S21 | Eleventh | −190.788 | 0.369 | 1.537 | 55.74 | 5.634 | −5.4411 |
| S22 | Lens | 2.967 | 0.206 | | | 6.046 | |
| S23 | Filter | Infinity | 0.245 | | | 6.942 | |
| S24 | | Infinity | 0.755 | | | 7.016 | |
| S25 | Imaging Surface | Infinity | | | | 7.171 | |

The seventh lens 307 has a negative refractive power, and a first surface and a second surface of the seventh lens 307 have a shape concave in the paraxial region.

The eighth lens 308 has a positive refractive power, and a first surface and a second surface of the eighth lens 308 have a shape convex in the paraxial region.

The ninth lens 309 has a negative refractive power, a first surface of the ninth lens 309 has a shape convex in the paraxial region, and a second surface of the ninth lens 309 has a shape concave in the paraxial region.

The tenth lens 310 has a positive refractive power, a first surface of the tenth lens 310 has a shape convex in the paraxial region, and a second surface of the tenth lens 310 has a shape concave in the paraxial region.

The eleventh lens 311 has a negative refractive power, and a first surface and a second surface of the eleventh lens 311 have a shape concave in the paraxial region.

Additionally, one or any combination of any two or more of the ninth lens 309 to the eleventh lens 311 has at least one inflection point formed on either one both of the first and second surfaces.

Each surface of each of the first lens 301 to the eleventh lens 311 has aspherical coefficients as illustrated in Table 6 below. For example, both the object-side surface and the image-side surface of each of the first lens 301 to the eleventh lens 311 are aspherical surfaces.

TABLE 6

| | S1 | S2 | S3 | S4 | S5 | S6 | S7 | S8 |
|---|---|---|---|---|---|---|---|---|
| Conic Constant (K) | −3.526E−01 | 1.154E+01 | −1.634E+01 | −8.360E+00 | −1.592E+01 | −6.823E+01 | −6.714E+01 | −9.900E+01 |
| Fourth Coefficient (A) | 1.596E−03 | 2.220E−03 | −2.804E−03 | −5.127E−03 | −1.336E−02 | 2.231E−03 | 2.259E−03 | −8.200E−03 |
| Sixth Coefficient (B) | 1.769E−03 | −1.951E−03 | 3.537E−06 | −5.001E−04 | 4.558E−03 | 4.025E−03 | 5.856E−03 | 4.250E−04 |
| Eighth Coefficient (C) | −4.006E−03 | 1.265E−03 | 5.386E−03 | 1.534E−02 | −5.090E−03 | −2.170E−02 | −3.820E−02 | −1.727E−02 |
| Tenth Coefficient (D) | 6.189E−03 | −1.684E−03 | −1.419E−02 | −4.122E−02 | 8.400E−03 | 6.016E−02 | 1.098E−01 | 5.355E−02 |
| Twelfth Coefficient (E) | −6.293E−03 | 1.619E−03 | 2.060E−02 | 6.573E−02 | −1.334E−02 | −1.200E−01 | −2.123E−01 | −9.368E−02 |
| Fourteenth Coefficient (F) | 4.437E−03 | −6.994E−04 | −1.925E−02 | −7.026E−02 | 1.746E−02 | 1.669E−01 | 2.829E−01 | 1.111E−01 |
| Sixteenth Coefficient (G) | −2.229E−03 | −8.249E−05 | 1.246E−02 | 5.288E−02 | −1.691E−02 | −1.625E−01 | −2.646E−01 | −9.330E−02 |
| Eighteenth Coefficient (H) | 8.097E−04 | 2.675E−04 | −5.763E−03 | −2.864E−02 | 1.164E−02 | 1.116E−01 | 1.758E−01 | 5.625E−02 |
| Twentieth Coefficient (J) | −2.131E−04 | −1.558E−04 | 1.924E−03 | 1.122E−02 | −5.634E−03 | −5.420E−02 | −8.308E−02 | −2.437E−02 |
| Twenty-Second Coefficient (L) | 4.024E−05 | 5.043E−05 | −4.602E−04 | −3.151E−03 | 1.899E−03 | 1.846E−02 | 2.767E−02 | 7.493E−03 |
| Twenty-Fourth Coefficient (M) | −5.313E−06 | −1.017E−05 | 7.695E−05 | 6.191E−04 | −4.354E−04 | −4.306E−03 | −6.331E−03 | −1.590E−03 |
| Twenty-Sixth Coefficient (N) | 4.655E−07 | 1.273E−06 | −8.540E−06 | −8.081E−05 | 6.468E−05 | 6.545E−04 | 9.458E−04 | 2.208E−04 |
| Twenty-Eighth Coefficient (O) | −2.431E−08 | −9.094E−08 | 5.650E−07 | 6.297E−06 | −5.607E−06 | −5.832E−05 | −8.298E−05 | −1.806E−05 |
| Thirtieth Coefficient (P) | 5.723E−10 | 2.840E−09 | −1.686E−08 | −2.217E−07 | 2.152E−07 | 2.309E−06 | 3.239E−06 | 6.591E−07 |

| | S9 | S10 | S11 | S12 | S13 | S14 | S15 | S16 |
|---|---|---|---|---|---|---|---|---|
| Conic Constant (K) | −8.343E+01 | 6.375E+01 | 7.350E+01 | 2.623E+01 | 1.789E+01 | 9.900E+01 | 9.900E+01 | 9.095E+01 |
| Fourth Coefficient (A) | 2.895E−03 | 1.128E−03 | −6.544E−04 | 7.415E−02 | 8.328E−02 | 1.760E−02 | 6.138E−04 | −7.435E−03 |
| Sixth Coefficient (B) | −4.533E−03 | −7.850E−03 | −3.296E−02 | −2.055E−01 | −2.349E−01 | −1.028E−01 | −5.640E−02 | −9.893E−03 |
| Eighth Coefficient (C) | −7.889E−03 | 2.005E−02 | 3.823E−02 | 3.079E−01 | 3.769E−01 | 1.913E−01 | 1.050E−01 | 5.353E−03 |
| Tenth Coefficient (D) | 2.352E−02 | −4.189E−02 | −3.175E−02 | −3.290E−01 | −4.158E−01 | −2.170E−01 | −1.139E−01 | −5.294E−04 |
| Twelfth Coefficient (E) | −3.194E−02 | 5.858E−02 | 1.505E−02 | 2.572E−01 | 3.275E−01 | 1.657E−01 | 8.274E−02 | −1.542E−03 |
| Fourteenth Coefficient (F) | 2.706E−02 | −5.727E−02 | −1.777E−03 | −1.505E−01 | −1.894E−01 | −8.967E−02 | −4.244E−02 | 1.435E−03 |
| Sixteenth Coefficient (G) | −1.482E−02 | 4.001E−02 | −2.498E−03 | 6.685E−02 | 8.191E−02 | 3.529E−02 | 1.576E−02 | −7.123E−04 |
| Eighteenth Coefficient (H) | 4.906E−03 | −2.019E−02 | 1.682E−03 | −2.254E−02 | −2.667E−02 | −1.022E−02 | −4.285E−03 | 2.316E−04 |
| Twentieth Coefficient (J) | −6.374E−04 | 7.359E−03 | −4.083E−04 | 5.696E−03 | 6.501E−03 | 2.179E−03 | 8.528E−04 | −5.168E−05 |
| Twenty-Second Coefficient (L) | −2.047E−04 | −1.917E−03 | −2.488E−05 | −1.054E−03 | −1.166E−03 | −3.379E−04 | −1.229E−04 | 7.961E−06 |
| Twenty-Fourth Coefficient (M) | 1.210E−04 | 3.476E−04 | 4.212E−05 | 1.375E−04 | 1.492E−04 | 3.705E−05 | 1.248E−05 | −8.307E−07 |
| Twenty-Sixth Coefficient (N) | −2.700E−05 | −4.160E−05 | −1.132E−05 | −1.188E−05 | −1.284E−05 | −2.724E−06 | −8.473E−07 | 5.592E−08 |

TABLE 6-continued

| | | | | | | | | |
|---|---|---|---|---|---|---|---|---|
| Twenty-Eighth Coefficient (O) | 3.006E−06 | 2.951E−06 | 1.392E−06 | 6.056E−07 | 6.658E−07 | 1.205E−07 | 3.449E−08 | −2.188E−09 |
| Thirtieth Coefficient (P) | −1.373E−07 | −9.371E−08 | −6.825E−08 | −1.365E−08 | −1.569E−08 | −2.427E−09 | −6.362E−10 | 3.774E−11 |

| | S17 | S18 | S19 | S20 | S21 | S22 |
|---|---|---|---|---|---|---|
| Conic Constant (K) | −1.482E+01 | −8.087E+01 | −1.147E+01 | −2.225E+01 | 9.900E+01 | −1.217E+01 |
| Fourth Coefficient (A) | −4.499E−03 | −2.386E−02 | 2.440E−02 | 2.307E−02 | −8.254E−02 | −3.832E−02 |
| Sixth Coefficient (B) | 1.060E−03 | 2.887E−05 | −2.084E−02 | −7.120E−03 | 2.921E−02 | 1.251E−02 |
| Eighth Coefficient (C) | −2.125E−03 | 4.967E−03 | 1.090E−02 | 5.032E−04 | −7.805E−03 | −2.958E−03 |
| Tenth Coefficient (D) | 1.730E−03 | −3.520E−03 | −4.686E−03 | 6.101E−05 | 1.523E−03 | 4.957E−04 |
| Twelfth Coefficient (E) | −9.104E−04 | 1.508E−03 | 1.494E−03 | 1.820E−06 | −2.156E−04 | −5.986E−05 |
| Fourteenth Coefficient (F) | 3.222E−04 | −4.606E−04 | −3.431E−04 | −7.453E−06 | 2.253E−05 | 5.275E−06 |
| Sixteenth Coefficient (G) | −7.968E−05 | 1.031E−04 | 5.659E−05 | 1.914E−06 | −1.754E−06 | −3.420E−07 |
| Eighteenth Coefficient (H) | 1.398E−05 | −1.689E−05 | −6.708E−06 | −2.493E−07 | 1.016E−07 | 1.638E−08 |
| Twentieth Coefficient (J) | −1.741E−06 | 2.008E−06 | 5.697E−07 | 1.929E−08 | −4.346E−09 | −5.785E−10 |
| Twenty-Second Coefficient (L) | 1.517E−07 | −1.703E−07 | −3.425E−08 | −8.862E−10 | 1.348E−10 | 1.488E−11 |
| Twenty-Fourth Coefficient (M) | −8.969E−09 | 9.991E−09 | 1.420E−09 | 2.068E−11 | −2.944E−12 | −2.716E−13 |
| Twenty-Sixth Coefficient (N) | 3.393E−10 | −3.840E−10 | −3.853E−11 | −3.516E−14 | 4.285E−14 | 3.336E−15 |
| Twenty-Eighth Coefficient (O) | −7.319E−12 | 8.683E−12 | 6.156E−13 | −8.865E−15 | −3.729E−16 | −2.475E−17 |
| Thirtieth Coefficient (P) | 6.718E−14 | −8.744E−14 | −4.384E−15 | 1.352E−16 | 1.467E−18 | 8.386E−20 |

Additionally, the optical imaging system 400 described above may have the aberration characteristics illustrated in FIG. 6.

Figure 7:
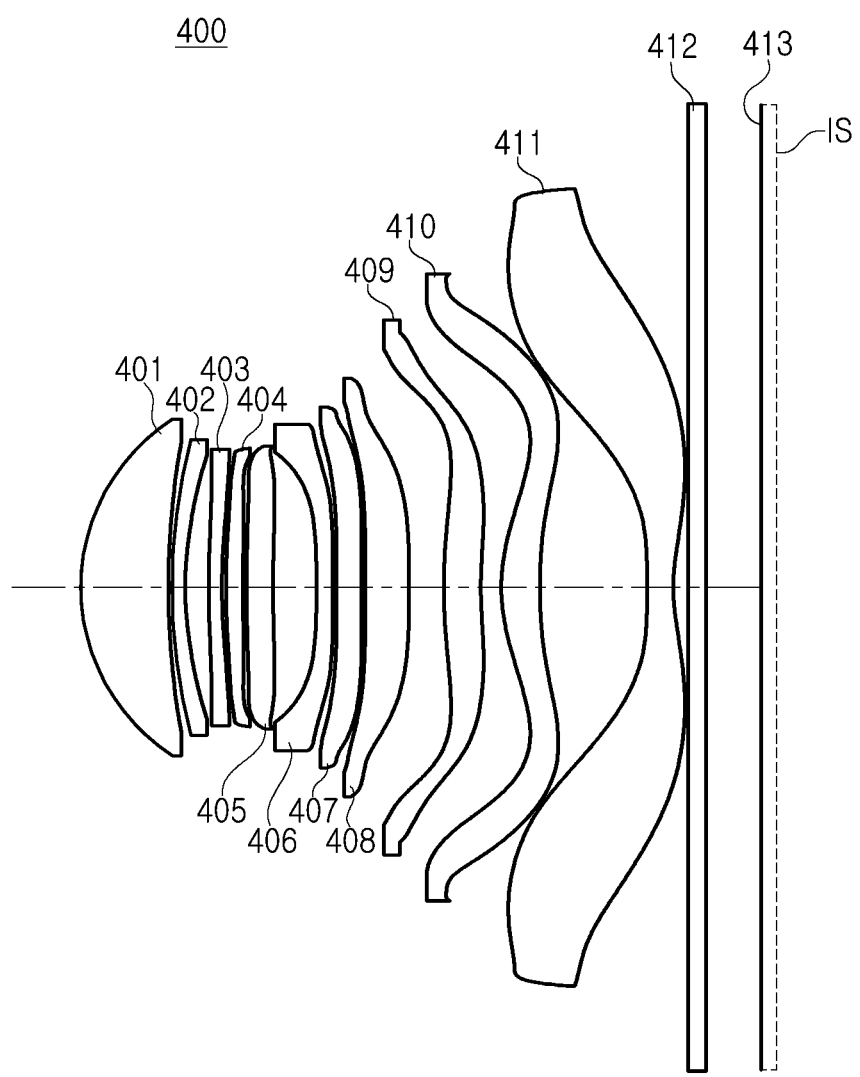
FIG. 7 is a structural view of an optical imaging system according to a fourth embodiment of the present disclosure.
Figure 8:
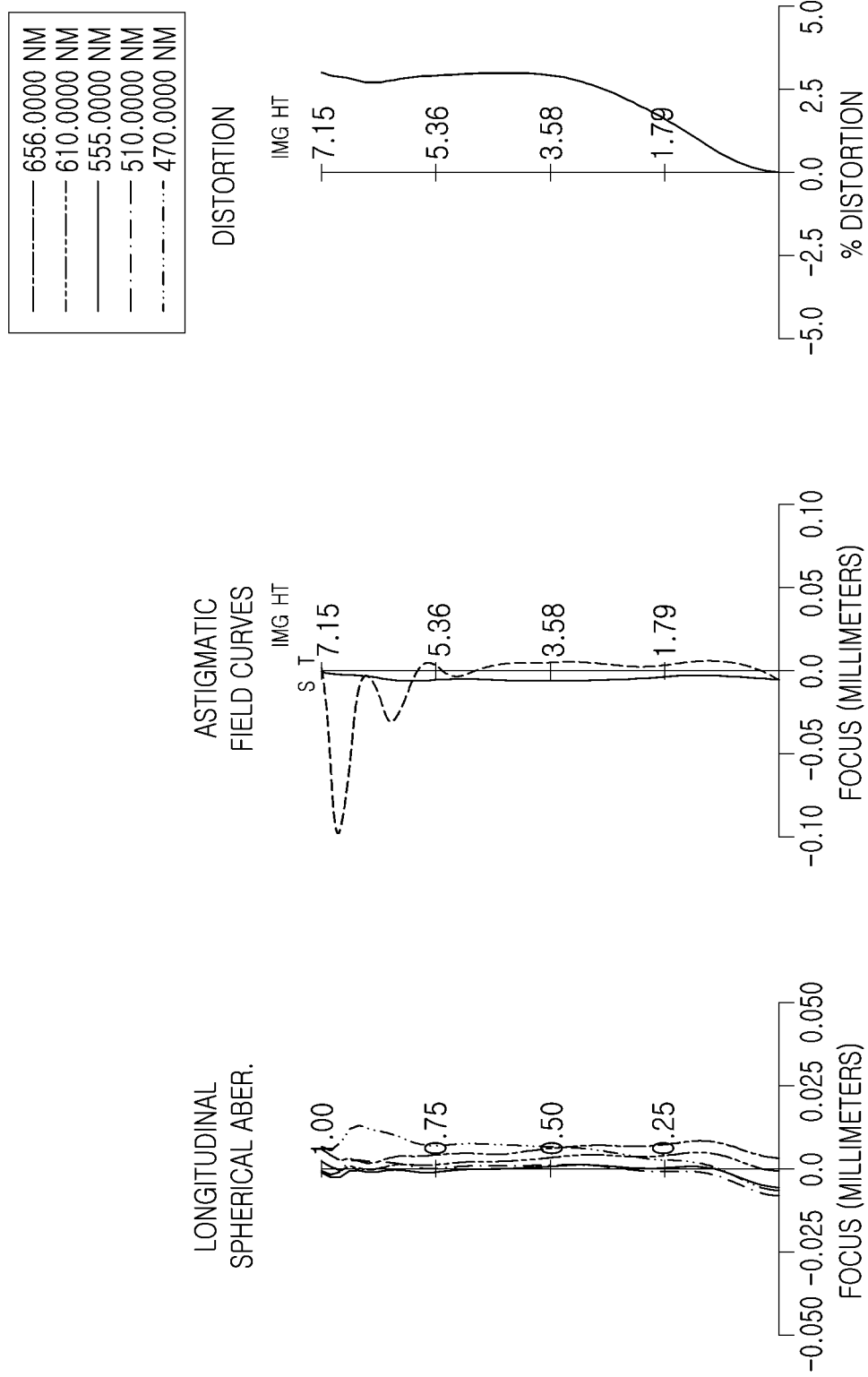
FIG. 8 is a view illustrating aberration characteristics of the optical imaging system illustrated in FIG. 7.

FIG. 7 is a structural view of an optical imaging system according to a fourth embodiment of the present disclosure, and FIG. 8 is a view illustrating aberration characteristics of the optical imaging system illustrated in FIG. 7.

Referring to FIGS. 7 and 8, an optical imaging system 400 according to the fourth embodiment of the present disclosure may include a first lens 401, a second lens 402, a third lens 403, a fourth lens 404, a fifth lens 405, a sixth lens 406, a seventh lens 407, an eighth lens 408, a ninth lens 409, a tenth lens 410, and an eleventh lens 411, and may further include a filter 412 and an image sensor IS.

The optical imaging system 400 according to the fourth embodiment of the present disclosure may focus an image on an imaging surface 413. The imaging surface 413 may be a surface on which an image is focused by the optical imaging system 400. For example, the imaging surface 413 may be a surface of the image sensor IS on which light is received.

An aperture (not shown) may be disposed between the second lens 402 and the third lens 403.

The lens characteristics of each lens (a radius of curvature of the first surface, a radius of curvature of the second surface, a thickness of the lens or a distance between the lens and the next lens, a refractive index, an Abbe number, an effective radius, and a focal length) are illustrated in Table 7 below.

TABLE 7

| Surface Number | Element | Radius of Curvature | Thickness/ Distance | Refractive Index | Abbe Number | Effective Radius | Focal Length |
|---|---|---|---|---|---|---|---|
| S1 | First | 3.214 | 1.206 | 1.546 | 55.99 | 2.362 | 7.3197 |
| S2 | Lens | 14.254 | 0.050 | | | 2.143 | |
| S3 | Second | 8.169 | 0.180 | 1.656 | 21.54 | 2.064 | −25.2244 |
| S4 | Lens | 5.420 | 0.321 | | | 1.961 | |
| S5 (Stop) | Third | 12.694 | 0.180 | 1.677 | 19.24 | 1.927 | −51.9541 |
| S6 | Lens | 9.274 | 0.058 | | | 1.932 | |
| S7 | Fourth | 12.824 | 0.230 | 1.546 | 55.99 | 1.939 | 40.3714 |
| S8 | Lens | 30.488 | 0.050 | | | 1.954 | |
| S9 | Fifth | 22.297 | 0.365 | 1.546 | 55.99 | 1.984 | 163.88 |
| S10 | Lens | 29.529 | 0.596 | | | 1.991 | |
| S11 | Sixth | −17.073 | 0.221 | 1.677 | 19.24 | 1.996 | −50 |
| S12 | Lens | −34.630 | 0.050 | | | 2.305 | |
| S13 | Seventh | −32.394 | 0.338 | 1.656 | 21.54 | 2.409 | −29.3629 |
| S14 | Lens | 47.664 | 0.050 | | | 2.540 | |
| S15 | Eighth | 78.396 | 0.605 | 1.570 | 37.40 | 2.736 | 40.1819 |

TABLE 7-continued

| Surface Number | Element | Radius of Curvature | Thickness/ Distance | Refractive Index | Abbe Number | Effective Radius | Focal Length |
|---|---|---|---|---|---|---|---|
| S16 | Lens | −32.258 | 0.479 | | | 2.949 | |
| S17 | Ninth | 8.740 | 0.507 | 1.570 | 37.40 | 3.528 | −50.9775 |
| S18 | Lens | 6.577 | 0.278 | | | 3.783 | |
| S19 | Tenth | 2.780 | 0.534 | 1.546 | 55.99 | 4.240 | 6.7211 |
| S20 | Lens | 10.706 | 1.464 | | | 4.434 | |
| S21 | Eleventh | −621.909 | 0.360 | 1.537 | 55.74 | 5.559 | −5.4928 |
| S22 | Lens | 2.962 | 0.207 | | | 5.987 | |
| S23 | Filter | Infinity | 0.245 | | | 6.877 | |
| S24 | | Infinity | 0.755 | | | 6.960 | |
| S25 | Imaging Surface | Infinity | | | | 7.151 | |

In an example, a total focal length f of the optical imaging system 400 according to the fourth embodiment of the present disclosure is 7.5711 mm, Fno is 1.69, IMG HT is 7.15 mm, and FOV is 85°.

In the fourth embodiment of the present disclosure, the first lens 401 has a positive refractive power, a first surface of the first lens 401 has a shape convex in the paraxial region, and a second surface of the first lens 401 has a shape concave in the paraxial region.

The second lens 402 has a negative refractive power, a first surface of the second lens 402 has a shape convex in the paraxial region, and a second surface of the second lens 402 has a shape concave in the paraxial region.

The third lens 403 has a negative refractive power, a first surface of the third lens 403 has a shape convex in the paraxial region, and a second surface of the third lens 403 has a shape concave in the paraxial region.

The fourth lens 404 has a positive refractive power, a first surface of the fourth lens 404 has a shape convex in the paraxial region, and a second surface of the fourth lens 404 has a shape concave in the paraxial region.

The fifth lens 405 has a positive refractive power, a first surface of the fifth lens 405 has a shape convex in the paraxial region, and a second surface of the fifth lens 405 has a shape concave in the paraxial region.

The sixth lens 406 has a negative refractive power, a first surface of the sixth lens 406 has a shape concave in the paraxial region, and a second surface of the sixth lens 406 has a shape convex in the paraxial region.

The seventh lens 407 has a negative refractive power, and a first surface and a second surface of the seventh lens 407 have a shape concave in the paraxial region.

The eighth lens 408 has a positive refractive power, and a first surface and a second surface of the eighth lens 408 have a shape convex in the paraxial region.

The ninth lens 409 has a negative refractive power, a first surface of the ninth lens 409 has a shape convex in the paraxial region, and a second surface of the ninth lens 409 has a shape concave in the paraxial region.

The tenth lens 410 has a positive refractive power, a first surface of the tenth lens 410 has a shape convex in the paraxial region, and a second surface of the tenth lens 410 has a shape concave in the paraxial region.

The eleventh lens 411 has a negative refractive power, and a first surface and a second surface of the eleventh lens 411 have a shape concave in the paraxial region.

Additionally, any one or any combination of any two or more of the ninth lens 409 to the eleventh lens 411 has at least one inflection point formed on either one or both of the first and second surfaces.

Each surface of each of the first lens 401 to the eleventh lens 411 has aspherical coefficients as illustrated in Table 8 below. For example, both the object-side surface and the image-side surface of each of the first lens 401 to the eleventh lens 411 are aspherical surfaces.

TABLE 8

| | S1 | S2 | S3 | S4 | S5 | S6 | S7 | S8 |
|---|---|---|---|---|---|---|---|---|
| Conic Constant (K) | −3.349E−01 | 1.340E+01 | −1.748E+01 | −8.533E+00 | −1.541E+01 | −8.308E+01 | −9.891E+01 | −9.900E+01 |
| Fourth Coefficient (A) | 1.583E−03 | 4.525E−03 | 7.189E−04 | −3.201E−03 | −1.494E−02 | 1.571E−03 | 4.537E−03 | −3.867E−03 |
| Sixth Coefficient (B) | 2.111E−03 | −6.547E−03 | −7.271E−03 | −3.299E−03 | 3.428E−03 | −2.029E−03 | −3.119E−03 | −9.272E−03 |
| Eighth Coefficient (C) | −5.059E−03 | 4.148E−03 | 8.689E−03 | 1.077E−02 | 2.852E−03 | 1.037E−03 | −1.045E−02 | 1.100E−02 |
| Tenth Coefficient (D) | 8.217E−03 | 1.021E−03 | −7.261E−03 | −2.152E−02 | −9.709E−03 | 7.199E−03 | 4.344E−02 | −1.061E−02 |
| Twelfth Coefficient (E) | −8.782E−03 | −5.573E−03 | 5.318E−03 | 3.138E−02 | 1.369E−02 | −3.471E−02 | −1.059E−01 | 7.073E−03 |
| Fourteenth Coefficient (F) | 6.494E−03 | 6.712E−03 | −3.183E−03 | −3.187E−02 | −1.024E−02 | 7.215E−02 | 1.679E−01 | 2.075E−03 |
| Sixteenth Coefficient (G) | −3.416E−03 | −4.861E−03 | 1.419E−03 | 2.280E−02 | 3.029E−03 | −8.834E−02 | −1.787E−01 | −1.092E−02 |
| Eighteenth Coefficient (H) | 1.297E−03 | 2.390E−03 | −4.246E−04 | −1.162E−02 | 1.399E−03 | 6.997E−02 | 1.304E−01 | 1.235E−02 |
| Twentieth Coefficient (J) | −3.565E−04 | −8.251E−04 | 6.668E−05 | 4.232E−03 | −1.864E−03 | −3.732E−02 | −6.599E−02 | −7.803E−03 |
| Twenty-Second Coefficient (L) | 7.025E−05 | 2.003E−04 | 3.314E−06 | −1.090E−03 | 9.135E−04 | 1.356E−02 | 2.312E−02 | 3.104E−03 |

TABLE 8-continued

| | | | | | | | | |
|---|---|---|---|---|---|---|---|---|
| Twenty-Fourth Coefficient (M) | −9.674E−06 | −3.350E−05 | −4.148E−06 | 1.933E−04 | −2.579E−04 | −3.317E−03 | −5.500E−03 | −7.951E−04 |
| Twenty-Sixth Coefficient (N) | 8.836E−07 | 3.677E−06 | 9.105E−07 | −2.239E−05 | 4.390E−05 | 5.228E−04 | 8.473E−04 | 1.277E−04 |
| Twenty-Eighth Coefficient (O) | −4.809E−08 | −2.383E−07 | −9.395E−08 | 1.518E−06 | −4.204E−06 | −4.796E−05 | −7.626E−05 | −1.175E−05 |
| Thirtieth Coefficient (P) | 1.180E−09 | 6.912E−09 | 3.943E−09 | −4.537E−08 | 1.746E−07 | 1.946E−06 | 3.043E−06 | 4.742E−07 |

| | S9 | S10 | S11 | S12 | S13 | S14 | S15 | S16 |
|---|---|---|---|---|---|---|---|---|
| Conic Constant (K) | −5.912E+01 | 6.732E+01 | 6.981E+01 | 9.900E+01 | 8.769E+01 | 8.449E+01 | 9.900E+01 | 8.889E+01 |
| Fourth Coefficient (A) | −8.038E−04 | 3.831E−04 | 2.408E−03 | 7.749E−02 | 8.034E−02 | 2.691E−02 | 1.884E−02 | −6.894E−03 |
| Sixth Coefficient (B) | −7.649E−03 | −1.034E−02 | −5.772E−02 | −2.588E−01 | −2.541E−01 | −1.323E−01 | −1.100E−01 | −1.375E−02 |
| Eighth Coefficient (C) | 1.673E−02 | 2.960E−02 | 1.025E−01 | 4.661E−01 | 4.586E−01 | 2.357E−01 | 1.863E−01 | 1.171E−02 |
| Tenth Coefficient (D) | −3.770E−02 | −6.103E−02 | −1.281E−01 | −5.795E−01 | −5.606E−01 | −2.575E−01 | −1.901E−01 | −6.085E−03 |
| Twelfth Coefficient (E) | 6.803E−02 | 8.583E−02 | 1.103E−01 | 5.091E−01 | 4.779E−01 | 1.893E−01 | 1.308E−01 | 1.897E−03 |
| Fourteenth Coefficient (F) | −8.593E−02 | −8.542E−02 | −6.524E−02 | −3.225E−01 | −2.911E−01 | −9.815E−02 | −6.350E−02 | −1.602E−04 |
| Sixteenth Coefficient (G) | 7.500E−02 | 6.112E−02 | 2.536E−02 | 1.496E−01 | 1.290E−01 | 3.683E−02 | 2.228E−02 | −1.561E−04 |
| Eighteenth Coefficient (H) | −4.586E−02 | −3.171E−02 | −5.431E−03 | −5.119E−02 | −4.195E−02 | −1.013E−02 | −5.710E−03 | 8.670E−05 |
| Twentieth Coefficient (J) | 1.980E−02 | 1.192E−02 | −7.899E−05 | 1.291E−02 | 1.002E−02 | 2.047E−03 | 1.070E−03 | −2.386E−05 |
| Twenty-Second Coefficient (L) | −6.013E−03 | −3.212E−03 | 4.594E−04 | −2.371E−03 | −1.735E−03 | −3.011E−04 | −1.453E−04 | 4.105E−06 |
| Twenty-Fourth Coefficient (M) | 1.256E−03 | 6.035E−04 | −1.530E−04 | 3.083E−04 | 2.120E−04 | 3.141E−05 | 1.394E−05 | −4.576E−07 |
| Twenty-Sixth Coefficient (N) | −1.718E−04 | −7.505E−05 | 2.616E−05 | −2.687E−05 | −1.733E−05 | −2.207E−06 | −8.966E−07 | 3.212E−08 |
| Twenty-Eighth Coefficient (O) | 1.383E−05 | 5.544E−06 | −2.415E−06 | 1.408E−06 | 8.498E−07 | 9.389E−08 | 3.475E−08 | −1.291E−09 |
| Thirtieth Coefficient (P) | −4.959E−07 | −1.839E−07 | 9.581E−08 | −3.354E−08 | −1.890E−08 | −1.830E−09 | −6.137E−10 | 2.264E−11 |

| | S17 | S18 | S19 | S20 | S21 | S22 |
|---|---|---|---|---|---|---|
| Conic Constant (K) | −1.610E+01 | −7.693E+01 | −1.091E+01 | −1.989E+01 | −9.900E+01 | −1.171E+01 |
| Fourth Coefficient (A) | −5.144E−03 | −2.455E−02 | 2.377E−02 | 2.349E−02 | −8.332E−02 | −3.993E−02 |
| Sixth Coefficient (B) | 1.401E−04 | 1.218E−03 | −2.013E−02 | −8.210E−03 | 2.994E−02 | 1.367E−02 |
| Eighth Coefficient (C) | −1.051E−03 | 4.065E−03 | 1.052E−02 | 1.371E−03 | −8.241E−03 | −3.433E−03 |
| Tenth Coefficient (D) | 1.156E−03 | −3.050E−03 | −4.507E−03 | −3.291E−04 | 1.675E−03 | 6.177E−04 |
| Twelfth Coefficient (E) | −7.218E−04 | 1.322E−03 | 1.425E−03 | 1.198E−04 | −2.483E−04 | −8.077E−05 |
| Fourteenth Coefficient (F) | 2.832E−04 | −4.053E−04 | −3.243E−04 | −3.281E−05 | 2.718E−05 | 7.758E−06 |
| Sixteenth Coefficient (G) | −7.507E−05 | 9.101E−05 | 5.295E−05 | 5.861E−06 | −2.209E−06 | −5.511E−07 |
| Eighteenth Coefficient (H) | 1.381E−05 | −1.503E−05 | −6.211E−06 | −6.979E−07 | 1.331E−07 | 2.902E−08 |
| Twentieth Coefficient (J) | −1.772E−06 | 1.811E−06 | 5.220E−07 | 5.646E−08 | −5.899E−09 | −1.129E−09 |
| Twenty-Second Coefficient (L) | 1.567E−07 | −1.561E−07 | −3.106E−08 | −3.103E−09 | 1.892E−10 | 3.195E−11 |
| Twenty-Fourth Coefficient (M) | −9.262E−09 | 9.330E−09 | 1.274E−09 | 1.132E−10 | −4.266E−12 | −6.399E−13 |
| Twenty-Sixth Coefficient (N) | 3.442E−10 | −3.656E−10 | −3.425E−11 | −2.594E−12 | 6.405E−14 | 8.585E−15 |
| Twenty-Eighth Coefficient (O) | −7.097E−12 | 8.426E−12 | 5.417E−13 | 3.320E−14 | −5.748E−16 | −6.916E−17 |
| Thirtieth Coefficient (P) | 5.924E−14 | −8.643E−14 | −3.821E−15 | −1.754E−16 | 2.332E−18 | 2.527E−19 |

Additionally, the optical imaging system 400 described above may have the aberration characteristics illustrated in FIG. 8.

Figure 9:
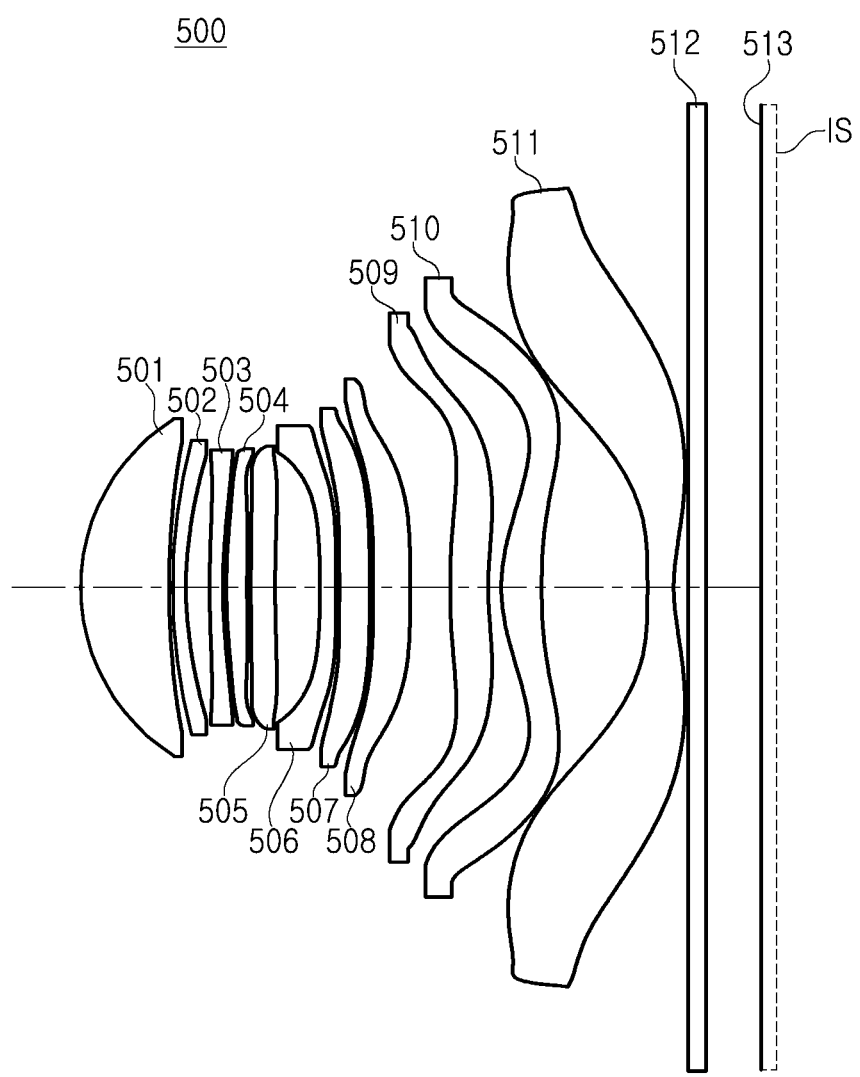
FIG. 9 is a structural view of an optical imaging system according to a fifth embodiment of the present disclosure.
Figure 10:
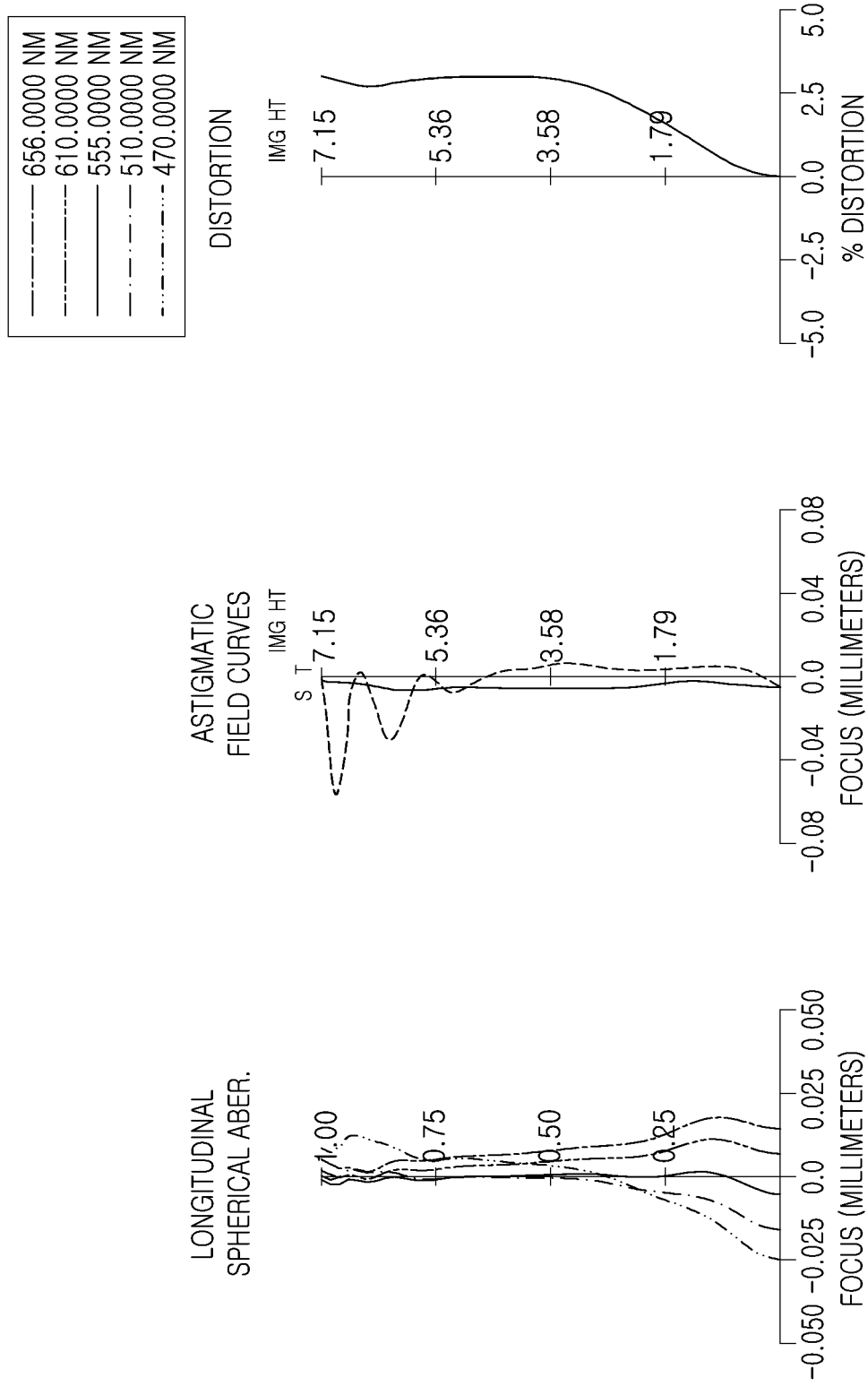
FIG. 10 is a view illustrating aberration characteristics of the optical imaging system illustrated in FIG. 9.

FIG. 9 is a structural view of an optical imaging system according to a fifth embodiment of the present disclosure, and FIG. 10 is a view illustrating aberration characteristics of the optical imaging system illustrated in FIG. 9.

Referring to FIGS. 9 and 10, an optical imaging system 500 according to the fifth embodiment of the present disclosure may include a first lens 501, a second lens 502, a third lens 503, a fourth lens 504, a fifth lens 505, a sixth lens 506, a seventh lens 507, an eighth lens 508, a ninth lens 509, a tenth lens 510, and an eleventh lens 511, and may further include a filter 512 and an image sensor IS.

The optical imaging system 500 according to the fifth embodiment of the present disclosure may focus an image on an imaging surface 513. The imaging surface 513 may be a surface on which an image is focused by the optical imaging system 500. For example, the imaging surface 513 may be a surface of the image sensor IS on which light is received.

An aperture (not shown) may be disposed between the second lens 502 and the third lens 503.

The lens characteristics of each lens (a radius of curvature of the first surface, a radius of curvature of the second surface, a thickness of the lens or a distance between the lens and the next lens, a refractive index, an Abbe number, an effective radius, and a focal length) are illustrated in Table 9 below.

The second lens 502 has a negative refractive power, a first surface of the second lens 502 has a shape convex in the paraxial region, and a second surface of the second lens 502 has a shape concave in the paraxial region.

The third lens 503 has a negative refractive power, a first surface of the third lens 503 has a shape convex in the paraxial region, and a second surface of the third lens 503 has a shape concave in the paraxial region.

The fourth lens 504 has a positive refractive power, a first surface of the fourth lens 504 has a shape convex in the paraxial region, and a second surface of the fourth lens 504 has a shape concave in the paraxial region.

The fifth lens 505 has a negative refractive power, a first surface of the fifth lens 505 has a shape convex in the paraxial region, and a second surface of the fifth lens 505 has a shape concave in the paraxial region.

The sixth lens 506 has a negative refractive power, a first surface of the sixth lens 506 has a shape concave in the paraxial region, and a second surface of the sixth lens 506 has a shape convex in the paraxial region.

The seventh lens 507 has a positive refractive power, a first surface of the seventh lens 507 has a shape concave in the paraxial region, and a second surface of the seventh lens 507 has a shape convex in the paraxial region.

The eighth lens 508 has a negative refractive power, a first surface of the eighth lens 508 has a shape concave in the paraxial region, and a second surface of the eighth lens 508 has a shape convex in the paraxial region.

TABLE 9

| Surface Number | Element | Radius of Curvature | Thickness/ Distance | Refractive Index | Abbe Number | Effective Radius | Focal Length |
|---|---|---|---|---|---|---|---|
| S1 | First | 3.208 | 1.214 | 1.546 | 55.99 | 2.377 | 7.3030 |
| S2 | Lens | 14.240 | 0.050 | | | 2.155 | |
| S3 | Second | 8.547 | 0.180 | 1.640 | 23.96 | 2.075 | −26.933 |
| S4 | Lens | 5.666 | 0.325 | | | 1.981 | |
| S5 (Stop) | Third | 13.361 | 0.180 | 1.677 | 19.24 | 1.940 | −30.8627 |
| S6 | Lens | 8.105 | 0.051 | | | 1.939 | |
| S7 | Fourth | 10.271 | 0.281 | 1.546 | 55.99 | 1.946 | 23.8995 |
| S8 | Lens | 47.851 | 0.050 | | | 1.958 | |
| S9 | Fifth | 31.722 | 0.335 | 1.546 | 55.99 | 1.988 | −396.358 |
| S10 | Lens | 27.562 | 0.612 | | | 1.997 | |
| S11 | Sixth | −16.894 | 0.221 | 1.677 | 19.24 | 2.001 | −70.8229 |
| S12 | Lens | −26.224 | 0.050 | | | 2.291 | |
| S13 | Seventh | −24.181 | 0.414 | 1.667 | 20.38 | 2.405 | 50 |
| S14 | Lens | −14.109 | 0.050 | | | 2.542 | |
| S15 | Eighth | −12.151 | 0.508 | 1.546 | 55.99 | 2.751 | −38.5306 |
| S16 | Lens | −29.205 | 0.543 | | | 2.950 | |
| S17 | Ninth | 10.014 | 0.523 | 1.570 | 37.40 | 3.590 | −19.7783 |
| S18 | Lens | 5.202 | 0.177 | | | 3.868 | |
| S19 | Tenth | 2.539 | 0.554 | 1.546 | 55.99 | 4.119 | 5.8428 |
| S20 | Lens | 11.502 | 1.449 | | | 4.377 | |
| S21 | Eleventh | −508.736 | 0.360 | 1.537 | 55.74 | 5.518 | −5.5473 |
| S22 | Lens | 2.995 | 0.202 | | | 5.951 | |
| S23 | Filter | Infinity | 0.245 | | | 6.880 | |
| S24 | | Infinity | 0.755 | | | 6.963 | |
| S25 | Imaging Surface | Infinity | | | | 7.150 | |

In an example, a total focal length f of the optical imaging system 500 according to the fifth embodiment of the present disclosure is 7.6078 mm, Fno is 1.69, IMG HT is 7.15 mm, and FOV is 84.726°.

In the fifth embodiment of the present disclosure, the first lens 501 has a positive refractive power, a first surface of the first lens 501 has a shape convex in the paraxial region, and a second surface of the first lens 501 has a shape concave in the paraxial region.

The ninth lens 509 has a negative refractive power, a first surface of the ninth lens 509 has a shape convex in the paraxial region, and a second surface of the ninth lens 509 has a shape concave in the paraxial region.

The tenth lens 510 has a positive refractive power, a first surface of the tenth lens 510 has a shape convex in the paraxial region, and a second surface of the tenth lens 510 has a shape concave in the paraxial region.

The eleventh lens 511 has a negative refractive power, and a first surface and a second surface of the eleventh lens 511 have a shape concave in the paraxial region.

Additionally, any one or any combination of any two or more of the ninth lens 509 to the eleventh lens 511 has at least one inflection point formed on either one or both of the first and second surfaces.

Each surface of each of the first lens 501 to the eleventh lens 511 has aspherical coefficients as illustrated in Table 10 below. For example, both the object-side surface and the image-side surface of each of the first lens 501 to the eleventh lens 511 are aspherical surfaces.

TABLE 10

| | S1 | S2 | S3 | S4 | S5 | S6 | S7 | S8 |
|---|---|---|---|---|---|---|---|---|
| Conic Constant (K) | −3.535E−01 | 1.305E+01 | −1.510E+01 | −8.851E+00 | −2.072E+01 | −6.151E+01 | −6.376E+01 | −9.900E+01 |
| Fourth Coefficient (A) | 1.491E−03 | 3.868E−03 | 5.467E−04 | −2.724E−03 | −1.586E−02 | 1.049E−03 | 3.670E−03 | −5.039E−03 |
| Sixth Coefficient (B) | 2.490E−03 | −4.632E−03 | −4.445E−03 | −2.005E−03 | 5.173E−03 | 1.647E−03 | 2.158E−03 | −2.348E−03 |
| Eighth Coefficient (C) | −6.256E−03 | −4.245E−06 | 5.767E−04 | 6.124E−03 | 1.033E−03 | 5.412E−03 | −5.737E−03 | −3.877E−03 |
| Tenth Coefficient (D) | 1.030E−02 | 7.541E−03 | 8.000E−03 | −1.315E−02 | −1.321E−02 | −3.363E−02 | −4.505E−03 | 1.731E−03 |
| Twelfth Coefficient (E) | −1.111E−02 | −1.274E−02 | −1.465E−02 | 2.105E−02 | 2.766E−02 | 6.453E−02 | 1.027E−02 | 1.108E−02 |
| Fourteenth Coefficient (F) | 8.278E−03 | 1.224E−02 | 1.532E−02 | −2.280E−02 | −3.238E−02 | −6.725E−02 | 4.269E−03 | −2.027E−02 |
| Sixteenth Coefficient (G) | −4.384E−03 | −7.896E−03 | −1.093E−02 | 1.703E−02 | 2.458E−02 | 4.121E−02 | −2.545E−02 | 1.764E−02 |
| Eighteenth Coefficient (H) | 1.674E−03 | 3.587E−03 | 5.564E−03 | −8.937E−03 | −1.277E−02 | −1.345E−02 | 3.078E−02 | −9.172E−03 |
| Twentieth Coefficient (J) | −4.623E−04 | −1.164E−03 | −2.047E−03 | 3.312E−03 | 4.611E−03 | 4.644E−04 | −2.040E−02 | 2.969E−03 |
| Twenty-Second Coefficient (L) | 9.146E−05 | 2.685E−04 | 5.400E−04 | −8.607E−04 | −1.151E−03 | 1.562E−03 | 8.484E−03 | −5.708E−04 |
| Twenty-Fourth Coefficient (M) | −1.263E−05 | −4.298E−05 | −9.955E−05 | 1.529E−04 | 1.928E−04 | −7.011E−04 | −2.276E−03 | 5.055E−05 |
| Twenty-Sixth Coefficient (N) | 1.156E−06 | 4.540E−06 | 1.217E−05 | −1.762E−05 | −2.032E−05 | 1.501E−04 | 3.835E−04 | 2.100E−06 |
| Twenty-Eighth Coefficient (O) | −6.300E−08 | −2.843E−07 | −8.860E−07 | 1.182E−06 | 1.180E−06 | −1.671E−05 | −3.701E−05 | −8.734E−07 |
| Thirtieth Coefficient (P) | 1.547E−09 | 7.995E−09 | 2.905E−08 | −3.472E−08 | −2.683E−08 | 7.764E−07 | 1.562E−06 | 5.719E−08 |

| | S9 | S10 | S11 | S12 | S13 | S14 | S15 | S16 |
|---|---|---|---|---|---|---|---|---|
| Conic Constant (K) | −4.437E+01 | 8.188E+01 | 6.844E+01 | 7.658E+01 | 4.814E+01 | −9.828E+01 | −9.900E+01 | 8.737E+01 |
| Fourth Coefficient (A) | −2.593E−04 | 1.520E−03 | 3.918E−03 | 9.540E−02 | 1.111E−01 | 1.146E−01 | 1.094E−01 | −6.048E−03 |
| Sixth Coefficient (B) | −4.453E−03 | −1.130E−02 | −5.845E−02 | −3.401E−01 | −3.628E−01 | −2.976E−01 | −2.875E−01 | −2.147E−02 |
| Eighth Coefficient (C) | 6.110E−03 | 3.279E−02 | 1.200E−01 | 6.278E−01 | 6.290E−01 | 4.180E−01 | 3.925E−01 | 2.205E−02 |
| Tenth Coefficient (D) | −2.728E−02 | −7.229E−02 | −1.685E−01 | −7.707E−01 | −7.210E−01 | −3.817E−01 | −3.428E−01 | −1.383E−02 |
| Twelfth Coefficient (E) | 6.719E−02 | 1.077E−01 | 1.595E−01 | 6.603E−01 | 5.746E−01 | 2.375E−01 | 2.025E−01 | 5.838E−03 |
| Fourteenth Coefficient (F) | −9.471E−02 | −1.117E−01 | −1.046E−01 | −4.087E−01 | −3.289E−01 | −1.039E−01 | −8.367E−02 | −1.640E−03 |
| Sixteenth Coefficient (G) | 8.619E−02 | 8.248E−02 | 4.738E−02 | 1.865E−01 | 1.381E−01 | 3.260E−02 | 2.463E−02 | 2.760E−04 |
| Eighteenth Coefficient (H) | −5.356E−02 | −4.390E−02 | −1.412E−02 | −6.328E−02 | −4.298E−02 | −7.406E−03 | −5.214E−03 | −1.313E−05 |
| Twentieth Coefficient (J) | 2.325E−02 | 1.687E−02 | 2.316E−03 | 1.592E−02 | 9.899E−03 | 1.218E−03 | 7.935E−04 | −5.949E−06 |
| Twenty-Second Coefficient (L) | −7.061E−03 | −4.637E−03 | 1.519E−05 | −2.929E−03 | −1.666E−03 | −1.431E−04 | −8.587E−05 | 1.710E−06 |
| Twenty-Fourth Coefficient (M) | 1.471E−03 | 8.884E−04 | −1.022E−04 | 3.824E−04 | 1.990E−04 | 1.167E−05 | 6.444E−06 | −2.307E−07 |
| Twenty-Sixth Coefficient (N) | −2.001E−04 | −1.126E−04 | 2.344E−05 | −3.355E−05 | −1.598E−05 | −6.240E−07 | −3.193E−07 | 1.790E−08 |
| Twenty-Eighth Coefficient (O) | 1.602E−05 | 8.487E−06 | −2.457E−06 | 1.772E−06 | 7.734E−07 | 1.953E−08 | 9.447E−09 | −7.651E−10 |
| Thirtieth Coefficient (P) | −5.705E−07 | −2.876E−07 | 1.049E−07 | −4.258E−08 | −1.703E−08 | −2.690E−10 | −1.279E−10 | 1.399E−11 |

| | S17 | S18 | S19 | S20 | S21 | S22 |
|---|---|---|---|---|---|---|
| Conic Constant (K) | −1.400E+01 | −6.879E+01 | −1.227E+01 | −1.830E+01 | 9.900E+01 | −1.239E+01 |

TABLE 10-continued

| | | | | | | |
|---|---|---|---|---|---|---|
| Fourth Coefficient (A) | -2.498E-03 | -2.085E-02 | 2.429E-02 | 2.125E-02 | -8.442E-02 | -3.964E-02 |
| Sixth Coefficient (B) | -9.182E-04 | -1.334E-03 | -2.082E-02 | -5.102E-03 | 3.095E-02 | 1.357E-02 |
| Eighth Coefficient (C) | -1.875E-03 | 4.652E-03 | 1.099E-02 | -6.200E-04 | -8.637E-03 | -3.395E-03 |
| Tenth Coefficient (D) | 2.372E-03 | -2.864E-03 | -4.819E-03 | 4.023E-04 | 1.760E-03 | 6.041E-04 |
| Twelfth Coefficient (E) | -1.459E-03 | 1.123E-03 | 1.563E-03 | -5.471E-05 | -2.594E-04 | -7.769E-05 |
| Fourteenth Coefficient (F) | 5.599E-04 | -3.256E-04 | -3.631E-04 | -4.093E-06 | 2.814E-05 | 7.311E-06 |
| Sixteenth Coefficient (G) | -1.457E-04 | 7.111E-05 | 6.020E-05 | 2.532E-06 | -2.264E-06 | -5.079E-07 |
| Eighteenth Coefficient (H) | 2.657E-05 | -1.157E-05 | -7.136E-06 | -4.271E-07 | 1.352E-07 | 2.615E-08 |
| Twentieth Coefficient (J) | -3.436E-06 | 1.376E-06 | 6.033E-07 | 4.153E-08 | -5.951E-09 | -9.959E-10 |
| Twenty-Second Coefficient (L) | 3.130E-07 | -1.169E-07 | -3.594E-08 | -2.599E-09 | 1.899E-10 | 2.770E-11 |
| Twenty-Fourth Coefficient (M) | -1.960E-08 | 6.860E-09 | 1.469E-09 | 1.065E-10 | -4.267E-12 | -5.473E-13 |
| Twenty-Sixth Coefficient (N) | 8.013E-10 | -2.631E-10 | -3.911E-11 | -2.774E-12 | 6.393E-14 | 7.277E-15 |
| Twenty-Eighth Coefficient (O) | -1.921E-11 | 5.918E-12 | 6.087E-13 | 4.175E-14 | -5.731E-16 | -5.835E-17 |
| Thirtieth Coefficient (P) | 2.042E-13 | -5.914E-14 | -4.190E-15 | -2.781E-16 | 2.325E-18 | 2.131E-19 |

Additionally, the optical imaging system 500 described above may have the aberration characteristics illustrated in FIG. 10.

Figure 11:
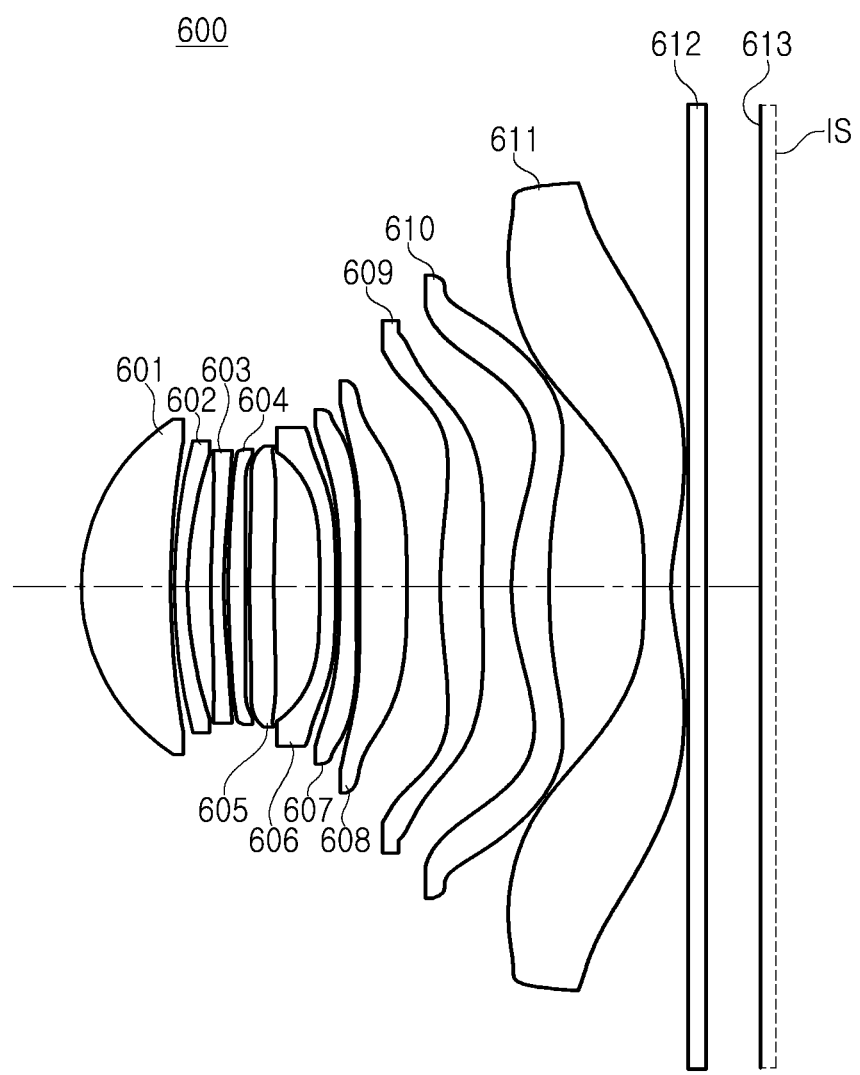
FIG. 11 is a structural view of an optical imaging system according to a sixth embodiment of the present disclosure.
Figure 12:
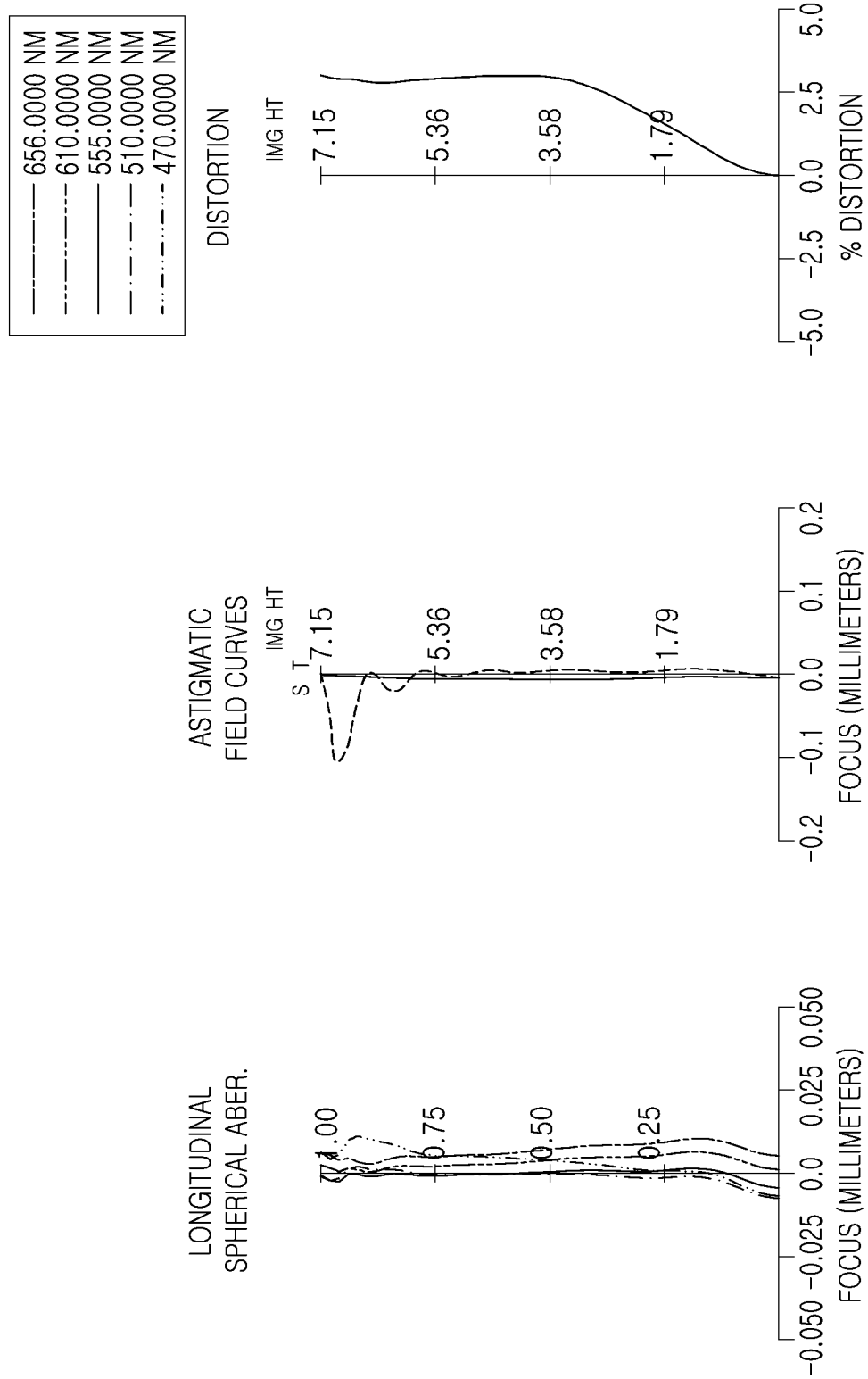
FIG. 12 is a view illustrating aberration characteristics of the optical imaging system illustrated in FIG. 11.

FIG. 11 is a structural view of an optical imaging system according to a sixth embodiment of the present disclosure, and FIG. 12 is a view illustrating aberration characteristics of the optical imaging system illustrated in FIG. 11.

Referring to FIGS. 11 and 12, the optical imaging system 600 according to the sixth embodiment of the present disclosure may include a first lens 601, a second lens 602, a third lens 603, a fourth lens 604, a fifth lens 605, a sixth lens 606, a seventh lens 607, an eighth lens 608, a ninth lens 609, a tenth lens 610, and an eleventh lens 611, and may further include a filter 612 and an image sensor IS.

The optical imaging system 600 according to the sixth embodiment of the present disclosure may focus an image on an imaging surface 613. The imaging surface 613 may be a surface on which an image is focused by the optical imaging system. For example, the imaging surface 613 may be a surface of the image sensor IS on which light is received.

An aperture (not shown) may be disposed between the second lens 602 and the third lens 603.

The lens characteristics of each lens (a radius of curvature of the first surface, a radius of curvature of the second surface, a thickness of the lens or a distance between the lens and the next lens, a refractive index, an Abbe number, an effective radius, and a focal length) are illustrated in Table 11 below.

TABLE 11

| Surface Number | Element | Radius of Curvature | Thickness/ Distance | Refractive Index | Abbe Number | Effective Radius | Focal Length |
|---|---|---|---|---|---|---|---|
| S1 | First | 3.213 | 1.223 | 1.546 | 55.99 | 2.370 | 7.2847 |
| S2 | Lens | 14.501 | 0.050 | | | 2.144 | |
| S3 | Second | 8.151 | 0.180 | 1.667 | 20.38 | 2.059 | -24.4048 |
| S4 | Lens | 5.382 | 0.321 | | | 1.952 | |
| S5 (Stop) | Third | 12.298 | 0.180 | 1.677 | 19.24 | 1.920 | -51.9297 |
| S6 | Lens | 9.057 | 0.058 | | | 1.925 | |
| S7 | Fourth | 12.545 | 0.236 | 1.546 | 55.99 | 1.933 | 37.9905 |
| S8 | Lens | 31.552 | 0.057 | | | 1.946 | |
| S9 | Fifth | 22.930 | 0.336 | 1.546 | 55.99 | 1.976 | 534.303 |
| S10 | Lens | 24.758 | 0.633 | | | 1.989 | |
| S11 | Sixth | -18.538 | 0.221 | 1.677 | 19.24 | 1.996 | 54.5224 |
| S12 | Lens | -12.400 | 0.050 | | | 2.258 | |
| S13 | Seventh | -12.397 | 0.223 | 1.667 | 20.38 | 2.362 | -13.5978 |
| S14 | Lens | 33.945 | 0.050 | | | 2.509 | |
| S15 | Eighth | 74.094 | 0.647 | 1.570 | 37.40 | 2.705 | 40.6144 |
| S16 | Lens | -33.555 | 0.463 | | | 2.902 | |
| S17 | Ninth | 8.066 | 0.571 | 1.570 | 37.40 | 3.505 | 33.3333 |
| S18 | Lens | 13.657 | 0.404 | | | 3.772 | |
| S19 | Tenth | 3.838 | 0.519 | 1.546 | 55.99 | 4.223 | 9.1756 |
| S20 | Lens | 15.640 | 1.302 | | | 4.403 | |
| S21 | Eleventh | 482.088 | 0.372 | 1.537 | 55.74 | 5.639 | -5.3113 |
| S22 | Lens | 2.833 | 0.232 | | | 6.117 | |
| S23 | Filter | Infinity | 0.245 | | | 6.921 | |
| S24 | | Infinity | 0.755 | | | 6.998 | |

TABLE 11-continued

| Surface Number | Element | Radius of Curvature | Thickness/ Distance | Refractive Index | Abbe Number | Effective Radius | Focal Length |
|---|---|---|---|---|---|---|---|
| S25 | Imaging Surface | Infinity | | | | 7.151 | |

In an example, a total focal length f of the optical imaging system 600 according to the sixth embodiment of the present disclosure is 7.5785 mm, Fno is 1.69, IMG HT is 7.15 mm, and FOV is 84.953°.

In the sixth embodiment of the present disclosure, the first lens 601 has a positive refractive power, a first surface of the first lens 601 has a shape convex in the paraxial region, and the second surface of the first lens 601 has a shape concave in the paraxial region.

The second lens 602 has a negative refractive power, a first surface of the second lens 602 has a shape convex in the paraxial region, and a second surface of the second lens 602 has a shape concave in the paraxial region.

The third lens 603 has a negative refractive power, a first surface of the third lens 603 has a shape convex in the paraxial region, and a second surface of the third lens 603 has a shape concave in the paraxial region.

The fourth lens 604 has a positive refractive power, a first surface of the fourth lens 604 has a shape convex in the paraxial region, and a second surface of the fourth lens 604 has a shape concave in the paraxial region.

The fifth lens 605 has a positive refractive power, a first surface of the fifth lens 605 has a shape convex in the paraxial region, and a second surface of the fifth lens 605 has a shape concave in the paraxial region.

The sixth lens 606 has a positive refractive power, a first surface of the sixth lens 606 has a shape concave in the paraxial region, and a second surface of the sixth lens 606 has a shape convex in the paraxial region.

The seventh lens 607 has a negative refractive power, and a first surface and a second surface of the seventh lens 607 have a shape concave in the paraxial region.

The eighth lens 608 has a positive refractive power, and a first surface and a second surface of the eighth lens 608 have a convex shape in the paraxial region.

The ninth lens 609 has a positive refractive power, a first surface of the ninth lens 609 has a shape convex in the paraxial region, and a second surface of the ninth lens 609 has a shape concave in the paraxial region.

The tenth lens 610 has a positive refractive power, a first surface of the tenth lens 610 has a shape convex in the paraxial region, and a second surface of the tenth lens 610 has a shape concave in the paraxial region.

The eleventh lens 611 has a negative refractive power, a first surface of the eleventh lens 611 has a shape convex in the paraxial region, and a second surface of the eleventh lens 611 has a shape concave in the paraxial region.

Additionally, any one or any combination of any two or more of the ninth lens 609 to the eleventh lens 611 has at least one inflection point formed on either one or both of the first and second surfaces.

Each surface of each of the first lens 601 to the eleventh lens 611 has aspherical coefficients as illustrated in Table 12 below. For example, both the object-side surface and the image-side surface of each of the first lens 601 to the eleventh lens 611 are aspherical surfaces.

TABLE 12

| | S1 | S2 | S3 | S4 | S5 | S6 | S7 | S8 |
|---|---|---|---|---|---|---|---|---|
| Conic Constant (K) | −3.331E−01 | 1.335E+01 | −1.703E+01 | −8.104E+00 | −1.540E+01 | −8.161E+01 | −9.900E+01 | −9.900E+01 |
| Fourth Coefficient (A) | 1.594E−03 | 4.512E−03 | 6.121E−04 | −3.345E−03 | −1.542E−02 | 8.443E−05 | 2.463E−03 | −5.383E−03 |
| Sixth Coefficient (B) | 1.986E−03 | −5.906E−03 | −5.840E−03 | −1.714E−03 | 6.900E−03 | 3.361E−03 | 2.591E−03 | −2.955E−03 |
| Eighth Coefficient (C) | −4.692E−03 | 2.813E−03 | 6.695E−03 | 8.504E−03 | −4.121E−03 | −8.028E−03 | −2.299E−02 | −8.570E−03 |
| Tenth Coefficient (D) | 7.478E−03 | 2.123E−03 | −7.030E−03 | −2.053E−02 | 9.294E−04 | 1.630E−02 | 6.305E−02 | 2.992E−02 |
| Twelfth Coefficient (E) | −7.817E−03 | −5.918E−03 | 7.581E−03 | 3.281E−02 | 1.101E−04 | −3.993E−02 | −1.290E−01 | −5.331E−02 |
| Fourteenth Coefficient (F) | 5.650E−03 | 6.552E−03 | −6.447E−03 | −3.497E−02 | 3.289E−03 | 7.227E−02 | 1.885E−01 | 6.760E−02 |
| Sixteenth Coefficient (G) | −2.907E−03 | −4.616E−03 | 3.975E−03 | 2.585E−02 | −7.055E−03 | −8.535E−02 | −1.920E−01 | −6.220E−02 |
| Eighteenth Coefficient (H) | 1.080E−03 | 2.245E−03 | −1.755E−03 | −1.356E−02 | 6.952E−03 | 6.690E−02 | 1.365E−01 | 4.116E−02 |
| Twentieth Coefficient (J) | −2.907E−04 | −7.711E−04 | 5.517E−04 | 5.078E−03 | −4.110E−03 | −3.563E−02 | −6.795E−02 | −1.937E−02 |
| Twenty-Second Coefficient (L) | 5.612E−05 | 1.867E−04 | −1.215E−04 | −1.346E−03 | 1.573E−03 | 1.298E−02 | 2.357E−02 | 6.388E−03 |
| Twenty-Fourth Coefficient (M) | −7.577E−06 | −3.116E−05 | 1.810E−05 | 2.462E−04 | −3.948E−04 | −3.190E−03 | −5.573E−03 | −1.437E−03 |
| Twenty-Sixth Coefficient (N) | 6.790E−07 | 3.413E−06 | −1.706E−06 | −2.949E−05 | 6.294E−05 | 5.058E−04 | 8.562E−04 | 2.097E−04 |
| Twenty-Eighth Coefficient (O) | −3.627E−08 | −2.208E−07 | 8.869E−08 | 2.075E−06 | −5.795E−06 | −4.674E−05 | −7.699E−05 | −1.789E−05 |
| Thirtieth Coefficient (P) | 8.736E−10 | 6.390E−09 | −1.784E−09 | −6.467E−08 | 2.350E−07 | 1.912E−06 | 3.074E−06 | 6.775E−07 |

TABLE 12-continued

| | S9 | S10 | S11 | S12 | S13 | S14 | S15 | S16 |
|---|---|---|---|---|---|---|---|---|
| Conic Constant (K) | −9.900E+01 | 6.473E+01 | 7.447E+01 | 2.626E+01 | 1.741E+01 | −4.928E+01 | 9.900E+01 | 9.900E+01 |
| Fourth Coefficient (A) | −2.383E−03 | −5.362E−04 | −2.674E−03 | 7.012E−02 | 8.340E−02 | 2.887E−02 | 1.091E−02 | −1.156E−02 |
| Sixth Coefficient (B) | −2.116E−03 | −7.637E−03 | −3.542E−02 | −2.009E−01 | −2.390E−01 | −1.324E−01 | −8.305E−02 | −1.123E−02 |
| Eighth Coefficient (C) | −7.853E−04 | 2.240E−02 | 5.939E−02 | 3.285E−01 | 4.036E−01 | 2.340E−01 | 1.429E−01 | 1.128E−02 |
| Tenth Coefficient (D) | −9.519E−04 | −4.887E−02 | −8.724E−02 | −3.894E−01 | −4.744E−01 | −2.627E−01 | −1.496E−01 | −6.897E−03 |
| Twelfth Coefficient (E) | 1.303E−02 | 7.229E−02 | 1.001E−01 | 3.340E−01 | 3.947E−01 | 2.023E−01 | 1.065E−01 | 2.785E−03 |
| Fourteenth Coefficient (F) | −2.633E−02 | −7.520E−02 | −8.921E−02 | −2.099E−01 | −2.366E−01 | −1.112E−01 | −5.392E−02 | −6.461E−04 |
| Sixteenth Coefficient (G) | 2.843E−02 | 5.595E−02 | 6.100E−02 | 9.797E−02 | 1.038E−01 | 4.458E−02 | 1.978E−02 | 1.358E−05 |
| Eighteenth Coefficient (H) | −1.970E−02 | −3.008E−02 | −3.162E−02 | −3.414E−02 | −3.362E−02 | −1.318E−02 | −5.309E−03 | 4.690E−05 |
| Twentieth Coefficient (J) | 9.304E−03 | 1.170E−02 | 1.225E−02 | 8.846E−03 | 8.022E−03 | 2.873E−03 | 1.042E−03 | −1.757E−05 |
| Twenty-Second Coefficient (L) | −3.040E−03 | −3.257E−03 | −3.481E−03 | −1.677E−03 | −1.392E−03 | −4.569E−04 | −1.480E−04 | 3.453E−06 |
| Twenty-Fourth Coefficient (M) | 6.784E−04 | 6.327E−04 | 7.025E−04 | 2.255E−04 | 1.707E−04 | 5.160E−05 | 1.482E−05 | −4.165E−07 |
| Twenty-Sixth Coefficient (N) | −9.877E−05 | −8.143E−05 | −9.530E−05 | −2.028E−05 | −1.402E−05 | −3.924E−06 | −9.930E−07 | 3.085E−08 |
| Twenty-Eighth Coefficient (O) | 8.448E−06 | 6.236E−06 | 7.783E−06 | 1.092E−06 | 6.907E−07 | 1.803E−07 | 3.995E−08 | −1.289E−09 |
| Thirtieth Coefficient (P) | −3.213E−07 | −2.151E−07 | 2.891E−07 | −2.649E−08 | −1.543E−08 | −3.784E−09 | −7.296E−10 | 2.330E−11 |

| | S17 | S18 | S19 | S20 | S21 | S22 |
|---|---|---|---|---|---|---|
| Conic Constant (K) | −1.696E+01 | −5.495E+01 | −1.251E+01 | −2.803E+01 | 9.900E+01 | −1.020E+01 |
| Fourth Coefficient (A) | 1.925E−03 | −1.263E−02 | 2.583E−02 | 2.529E−02 | −7.928E−02 | −3.884E−02 |
| Sixth Coefficient (B) | −1.203E−02 | −1.185E−02 | −2.239E−02 | −1.135E−02 | 2.701E−02 | 1.282E−02 |
| Eighth Coefficient (C) | 9.911E−03 | 1.295E−02 | 1.168E−02 | 3.633E−03 | −6.823E−03 | −3.039E−03 |
| Tenth Coefficient (D) | −5.629E−03 | −7.606E−03 | −4.976E−03 | −1.317E−03 | 1.261E−03 | 5.148E−04 |
| Twelfth Coefficient (E) | 2.320E−03 | 3.098E−03 | 1.579E−03 | 4.120E−04 | −1.717E−04 | −6.360E−05 |
| Fourteenth Coefficient (F) | −7.151E−04 | −9.216E−04 | −3.624E−04 | −9.427E−05 | 1.761E−05 | 5.792E−06 |
| Sixteenth Coefficient (G) | 1.656E−04 | 2.016E−04 | 5.990E−05 | 1.526E−05 | −1.371E−06 | −3.905E−07 |
| Eighteenth Coefficient (H) | −2.877E−05 | −3.238E−05 | −7.126E−06 | −1.749E−06 | 8.045E−08 | 1.949E−08 |
| Twentieth Coefficient (J) | 3.726E−06 | 3.790E−06 | 6.079E−07 | 1.421E−07 | −3.509E−09 | −7.163E−10 |
| Twenty-Second Coefficient (L) | −3.536E−07 | −3.177E−07 | −3.673E−08 | −8.107E−09 | 1.114E−10 | 1.911E−11 |
| Twenty-Fourth Coefficient (M) | 2.383E−08 | 1.852E−08 | 1.531E−09 | 3.170E−10 | −2.489E−12 | −3.600E−13 |
| Twenty-Sixth Coefficient (N) | −1.076E−09 | −7.108E−10 | −4.179E−11 | −8.076E−12 | 3.708E−14 | 4.535E−15 |
| Twenty-Eighth Coefficient (O) | 2.912E−11 | 1.612E−11 | 6.715E−13 | 1.205E−13 | −3.298E−16 | −3.429E−17 |
| Thirtieth Coefficient (P) | −3.558E−13 | −1.633E−13 | −4.812E−15 | −7.987E−16 | 1.325E−18 | 1.177E−19 |

Additionally, the optical imaging system 600 described above may have the aberration characteristics illustrated in FIG. 12.

Table 13 below shows values of Conditional Expressions 1 to 12 of each of the optical imaging systems 100 to 600 according to the first to sixth embodiments.

TABLE 13

| Conditional Expression | Emb. 1 | Emb. 2 | Emb. 3 | Emb. 4 | Emb. 5 | Emb. 6 |
|---|---|---|---|---|---|---|
| TTL/(2 × IMG HT) < 0.660 | 0.652 | 0.652 | 0.652 | 0.652 | 0.652 | 0.652 |
| Fno < 1.70 | 1.69 | 1.69 | 1.69 | 1.69 | 1.69 | 1.69 |
| D15/L1S1E < 1.200 | 1.114 | 1.107 | 1.125 | 1.118 | 1.122 | 1.115 |
| Nv50 ≥ 5 | 6 | 6 | 7 | 6 | 5 | 6 |
| Nv24 ≥ 3 | 4 | 3 | 4 | 4 | 4 | 4 |
| 30 < v1-v2 < 45 | 35.61 | 36.75 | 36.75 | 34.45 | 32.03 | 35.61 |
| 30 < v1-v3 < 45 | 36.75 | 18.59 | 36.75 | 36.75 | 36.75 | 36.75 |
| 30 < v1-v6 < 45 | 36.75 | 36.75 | 36.75 | 36.75 | 36.75 | 36.75 |
| 30 < v1-v7 < 45 | 35.61 | 36.75 | 36.75 | 34.45 | 35.61 | 35.61 |
| 15 < v1-v9 < 25 | 18.59 | 18.59 | 18.59 | 18.59 | 18.59 | 18.59 |
| f345/f1 > 6 | 15.791 | 6.174 | 13.705 | 11.951 | 20.280 | 15.640 |
| 4 < |f678|/f1 < 7 | 5.414 | 6.005 | 5.032 | 4.770 | 6.764 | 4.554 |

According to the embodiments of an optical imaging system according to the present disclosure described above, a size of the optical imaging system may decrease while implementing a high resolution.

While this disclosure includes specific examples, it will be apparent after an understanding of the disclosure of this application that various changes in form and details may be made in these examples without departing from the spirit and scope of the claims and their equivalents. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
   a first lens, a second lens, a third lens, a fourth lens, a fifth lens, a sixth lens, a seventh lens, an eighth lens, a ninth lens, a tenth lens, and an eleventh lens sequentially arranged in ascending numerical order along an optical axis of the optical imaging system from an object side of the optical imaging system toward an imaging surface of the optical imaging system,
   wherein the first lens has a positive refractive power, and the second lens has a negative refractive power,
   at least two lenses sequentially arranged along the optical axis among the first lens to the fourth lens have an Abbe number of less than 38, and
   TTL/(2×IMG HT)<0.660 is satisfied, where TTL is a distance along the optical axis from an object-side surface of the first lens to the imaging surface, and IMG HT is one half of a diagonal length of the imaging surface.

2. The optical imaging system of claim 1, wherein either one or both of 30<v1-v2<45 and 30<v1-v3<45 is satisfied, where v1 is an Abbe number of the first lens, v2 is an Abbe number of the second lens, and v3 is an Abbe number of the third lens.

3. The optical imaging system of claim 1, wherein at least two lenses sequentially arranged along the optical axis among the fifth to ninth lenses have an Abbe number of less than 38.

4. The optical imaging system of claim 3, wherein any one or any combination of any two or more of 30<v1-v6<45, 30<v1-v7<45, and 15<v1-v9<25 is satisfied, where v1 is an Abbe number of the first lens, v6 is an Abbe number of the sixth lens, v7 is an Abbe number of the seventh lens, and v9 is an Abbe number of the ninth lens.

5. The optical imaging system of claim 1, wherein at least two lenses sequentially arranged along the optical axis among the second lens to the seventh lens have an Abbe number of less than 24.

6. The optical imaging system of claim 1, wherein any one or any combination of any two or more of the third lens to the fifth lens has a refractive index of greater than 1.56 and an Abbe number of less than 38.

7. The optical imaging system of claim 1, wherein any one or any combination of any two or more of the sixth lens to the eighth lens has a refractive index of greater than 1.67 and an Abbe number of less than 20.

8. The optical imaging system of claim 1, wherein Fno<1.70 is satisfied, where Fno is an f-number of the optical imaging system.

9. The optical imaging system of claim 1, wherein D15/L1S1E<1.200 is satisfied, where D15 is a distance along the optical axis from the object-side surface of the first lens to an image-side surface of the fifth lens, and L1S1E is an effective radius of the object-side surface of the first lens.

10. The optical imaging system of claim 1, wherein Nv50≥5 is satisfied, where Nv50 is a number of lenses among the first to eleventh lenses having an Abbe number of less than 50.

11. The optical imaging system of claim 10, wherein Nv24≥3 is satisfied, where Nv24 is a number of lenses among the first to eleventh lenses having an Abbe number of less than 24.

12. The optical imaging system of claim 1, wherein a composite focal length of the third lens, the fourth lens, and the fifth lens has a positive value, and
   the composite focal length of the third lens, the fourth lens, and the fifth lens is greater than an absolute value of a focal length of the second lens.

13. The optical imaging system of claim 12, wherein f345/f1>6 is satisfied, where f345 is the composite focal length of the third lens, the fourth lens, and the fifth lens, and f1 is a focal length of the first lens.

14. The optical imaging system of claim 12, wherein a composite focal length of the sixth lens, the seventh lens, and the eighth lens has a negative value, and
   an absolute value of the composite focal length of the sixth lens, the seventh lens, and the eighth lens is less than a focal length of each of the third lens, the fourth lens, and the fifth lens.

15. The optical imaging system of claim 14, wherein 4<|f678|/f1<7 is satisfied, where f678 is the composite focal length of the sixth lens, the seventh lens, and the eighth lens, and f1 is a focal length of the first lens.

16. The optical imaging system of claim 1, wherein each of the first lens to the fifth lens has a convex object-side surface in a paraxial region thereof, and a concave image-side surface in a paraxial region thereof.

17. The optical imaging system of claim 1, wherein the sixth lens has a concave object-side surface in a paraxial region thereof, and a convex image-side surface in a paraxial region thereof.

18. The optical imaging system of claim 1, wherein the seventh lens has a concave object-side surface in a paraxial region thereof.

19. The optical imaging system of claim 1, wherein the eighth lens has a convex image-side surface in a paraxial region thereof.

20. The optical imaging system of claim 1, wherein the ninth lens has a convex object-side surface in a paraxial region thereof, and a concave image-side surface in a paraxial region thereof.

21. The optical imaging system of claim 1, wherein the tenth lens has a positive refractive power, a convex object-side surface in a paraxial region thereof, and a concave image-side surface in a paraxial region thereof.

22. The optical imaging system of claim 1, wherein the eleventh lens has a negative refractive power, and a concave image-side surface in a paraxial region thereof.

23. The optical imaging system of claim 1, wherein the tenth lens has a positive refractive power, and the eleventh lens has a negative refractive power.

24. An optical imaging system comprising:
a first lens, a second lens, a third lens, a fourth lens, a fifth lens, a sixth lens, a seventh lens, an eighth lens, a ninth lens, a tenth lens, and an eleventh lens sequentially arranged in ascending numerical order along an optical axis of the optical imaging system from an object side of the optical imaging system toward an imaging surface of the optical imaging system,
wherein the first lens has a positive refractive power, and the second lens has a negative refractive power,
$Nv24 \geq 3$ is satisfied, where Nv24 is a number of lenses among the first to eleventh lenses having an Abbe number of less than 24, and
$TTL/(2 \times IMG\ HT) < 0.660$ is satisfied, where TTL is a distance along the optical axis from an object-side surface of the first lens to the imaging surface, and IMG HT is one half of a diagonal length of the imaging surface.

25. The optical imaging system of claim 24, wherein the tenth lens has a positive refractive power, and the eleventh lens has a negative refractive power.

26. The optical imaging system of claim 24, wherein each of the first to fifth, ninth, and tenth lenses has a convex object-side surface in a paraxial region thereof, and a concave image-side surface in a paraxial region thereof.

27. The optical imaging system of claim 24, wherein the sixth lens has a concave object-side surface in a paraxial region thereof, and a convex image-side surface in a paraxial region thereof.

28. An optical imaging system comprising:
a first lens, a second lens, a third lens, a fourth lens, a fifth lens, a sixth lens, a seventh lens, an eighth lens, a ninth lens, a tenth lens, and an eleventh lens sequentially arranged in ascending numerical order along an optical axis of the optical imaging system from an object side of the optical imaging system toward an imaging surface of the optical imaging system,
wherein the tenth lens has a positive refractive power, and the eleventh lens has a negative refractive power,
$Nv24 \geq 3$ is satisfied, where Nv24 is a number of lenses among the first to eleventh lenses having an Abbe number of less than 24, and
$TTL/(2 \times IMG\ HT) < 0.660$ is satisfied, where TTL is a distance along the optical axis from an object-side surface of the first lens to the imaging surface, and IMG HT is one half of a diagonal length of the imaging surface.

29. The optical imaging system of claim 28, wherein $Nv50 \geq 5$ is satisfied, where Nv50 is a number of lenses among the first to eleventh lenses having an Abbe number of less than 50.

30. The optical imaging system of claim 28, wherein each of the first to fifth, ninth, and tenth lenses has a convex object-side surface in a paraxial region thereof, and a concave image-side surface in a paraxial region thereof.

31. The optical imaging system of claim 28, wherein the sixth lens has a concave object-side surface in a paraxial region thereof, and a convex image-side surface in a paraxial region thereof.

* * * * *